US006820035B1

(12) United States Patent
Zahavi

(10) Patent No.: US 6,820,035 B1
(45) Date of Patent: Nov. 16, 2004

(54) SYSTEM AND METHOD FOR DETERMINING WORKLOAD CHARACTERISTICS FOR ONE OR MORE APPLICATIONS OPERATING IN A DATA STORAGE ENVIRONMENT

(75) Inventor: William Zahavi, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 78 days.

(21) Appl. No.: 10/180,703

(22) Filed: Jun. 26, 2002

Related U.S. Application Data

(63) Continuation-in-part of application No. 09/965,431, filed on Sep. 27, 2001.

(51) Int. Cl.[7] .................. G06F 12/00

(52) U.S. Cl. .................. 702/182

(58) Field of Search .................. 702/182, 19; 800/8, 800/13; 725/14; 424/145, 405; 435/7; 705/37; 711/112, 114; 379/22; 530/350; 514/2; 356/318; 600/512, 436, 300; 607/45; 436/86, 6; 713/201; 714/4; 422/68, 68.1; 250/339; 348/153; 128/630

(56) References Cited

U.S. PATENT DOCUMENTS

| | | | | | |
|---|---|---|---|---|---|
| 5,491,511 | A | * | 2/1996 | Odle | 348/153 |
| 5,692,501 | A | * | 12/1997 | Minturn | 600/301 |
| 2003/0028722 | A1 | * | 2/2003 | Bachmat et al. | 711/112 |

* cited by examiner

*Primary Examiner*—John Barlow
*Assistant Examiner*—Tung Lau
(74) *Attorney, Agent, or Firm*—Robert Kevin Perkins; Leanne J. Fitzgerald; John M. Gunther

(57) ABSTRACT

This invention is a system and method for performing a data management function using correlated data obtained from analyzing work performed on data stored in a data storage system.

21 Claims, 26 Drawing Sheets

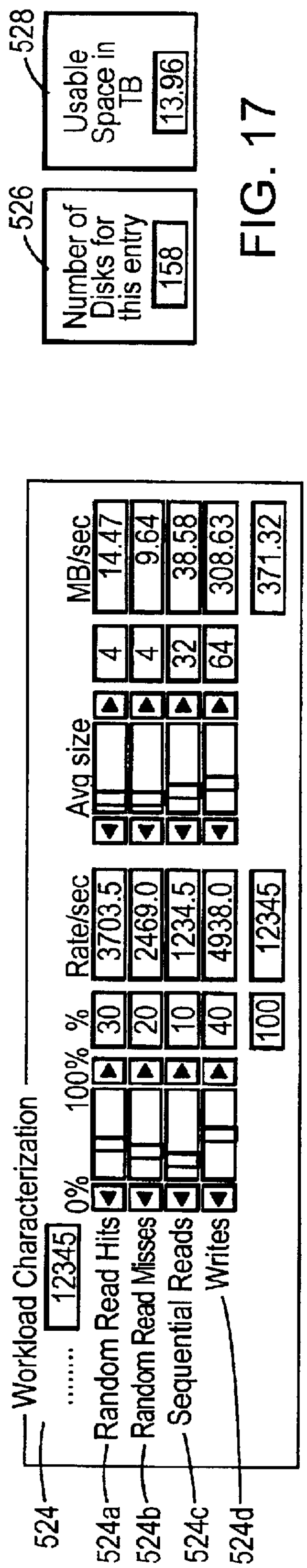
FIG. 14
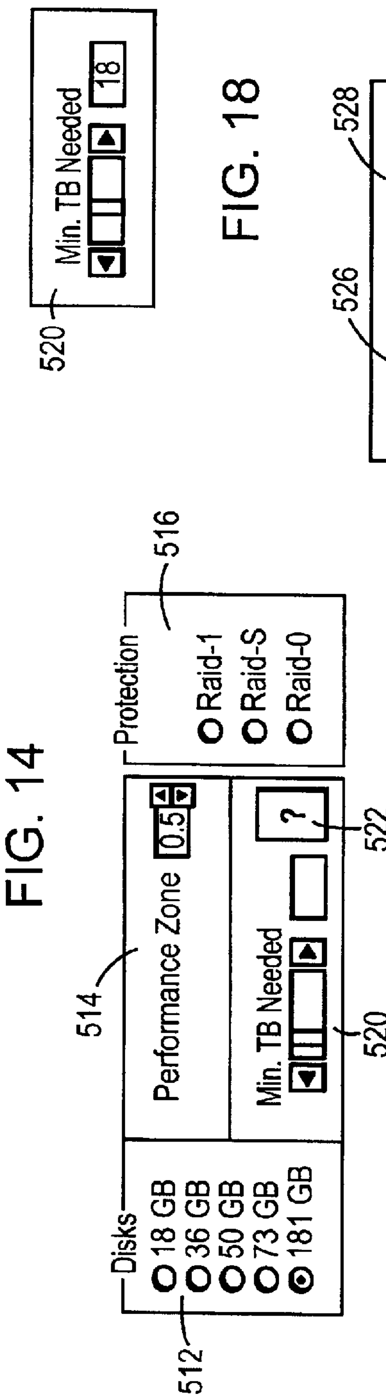
FIG. 15
Number of Disks for this entry
158
Usable Space in TB
13.96
526
528
FIG. 17
Min. TB Needed
18
520
FIG. 18
Number of Disks for this entry
204
Usable Space in TB
18.03
526
528
FIG. 19

SYSTEM AND METHOD FOR DETERMINING WORKLOAD CHARACTERISTICS FOR ONE OR MORE APPLICATIONS OPERATING IN A DATA STORAGE ENVIRONMENT

This application is a continuation-in-part of co-pending U.S. patent application Ser. No. 09/965,431 by William Zahavi, filed Sep. 27, 2001, and is assigned to the same assignee as this invention. Priority is hereby claimed under 35 USC 120 from the filing date of the co-pending patent application, which is hereby incorporated by reference.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to managing and analyzing data in a data storage environment, and more particularly to a system and method for determining workload characteristics including the profiles for such characteristics for one or more applications operating in a data storage environment.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. Mass storage systems particular those of the disk array type have centralized data as a hub of operations all driving down costs. But performance demands placed on such mass storage have increased and continue to do so.

Design objective for mass storage systems include cost, performance, and availability. Objectives typically include are a low cost per megabyte, a high I/O performance, and high data availability. Availability is measured by the ability to access data. Often such data availability is provided by use of redundancy such as well-known mirroring techniques.

One problem encountered in the implementation of disk array data storage systems concerns optimizing the storage capacity while maintaining the desired availability and reliability of the data through redundancy. It is important to allocate as closely as possible the right amount of storage capacity with going over or under significantly because of cost and necessity but this is a complex task. It has required great deal of skill and knowledge about computers, software applications such as databases, and the very specialized field of data storage. Such requisite abilities have long been expensive and difficult to access. There remains and probably will be an increasing demand for and corresponding scarcity of such skilled people.

Determining the size and number of disk array or other data storage system needed by a customer requires information about both space, traffic and a desired quality of service. It is not sufficient to size a solution simply based on the perceived quantity of capacity desired, such as the number of terabytes believed to be adequate.

There is a long-felt need for a computer-based tool that would allow a straightforward non-complex way to allocate proper storage capacity while balancing cost, growth plans, workload, and performance requirements. This would be advancement in the computer arts with particular relevance in the field of data storage.

Another problem that exists is the need for an automated tool that is capable of building a highly granulated graph or profile of workload data collected from work on a storage system, such as IO or response time data. Although workload data may be collected by prior art systems such as the ECC Workload Analyzer available from EMC Corporation of Hopkinton, the ability to particularly identify information related to variables of interest is not available on automated systems in the art. It would be an advantage of a such highly resolved profile information could be either used separately or combined with the computer-based tool for allocating capacity as described above.

For example, given a data storage environment wherein several hundred storage devices, e.g. hard disk drives operate in conjunction with a storage array such as the EMC Symmetrix or EMC Clariion the IO workload generated is highly complex and difficult to analyze. It would be advantageous if the workload could be used to sort data volumes or logical devices according to which devices contain data being used for the work. If such a sorting action could be used further to sort such devices into groups or families of devices having similar work characteristics or being used by similar or identical software applications this would be a further advantage. But since the date being used to create a workload is distributed across many disks it is complex to sort out such information and so no tool in the prior art is capable of making such a determination. Nevertheless, it would clearly be advancement in the computer arts and a satisfaction of a long-felt need if such a tool were available.

Further, if such a tool could identify how many business applications are active as well as which devices have data used by such applications it would be useful and advantageous. Further if the tool could do these on a relatively automated basis, such that a high-degree of computer expertise was not needed to use such a tool this would also be a significant advancement in the computer arts.

SUMMARY OF THE INVENTION

To overcome the problems described above and to provide the advantages also described above, the present invention is a system and method for using work related data for a storage management function. In one embodiment the method uses a dataset on which work is performed, wherein the dataset represents data stored on one or more logical devices that are part of a data storage environment. This method embodiment includes the step of analyzing work performed on the dataset to determine a correlation between at least two logical devices, and using the correlation to perform a storage management function.

In an embodiment of the system a computer with display and memory are configured with computer-executable program logic capable of performing steps of analyzing work-related data for creating a correlation of logical devices and then using the correlation to perform a storage management function.

In another embodiment, a program product includes a computer-readable medium having code included on the medium configured to carry out computer-executed steps of analyzing work-related data for creating a correlation of logical devices and then using the correlation to perform a storage management function.

BRIEF DESCRIPTION OF THE DRAWINGS

The above and further advantages of the present invention may be better under stood by referring to the following description taken into conjunction with the accompanying drawings in which:

FIG. 14 is another exemplary representation of a user interface screen for using this invention;

FIG. 15 is another exemplary representation of a user interface screen for using this invention;

FIG. 17 is another exemplary representation of a user interface screen for using this invention;

FIG. 18 is another exemplary representation of a user interface screen for using this invention;

FIG. 19 is another exemplary representation of a user interface screen for using this invention;

DETAILED DESCRIPTION OF THE PREFERRED EMBODIMENT

The methods and apparatus of the present invention are intended for use with data storage systems, such as the Symmetrix Integrated Cache Disk Array system available from EMC Corporation of Hopkinton, Mass. Specifically, this invention is directed to a configuration method and system for storage capacity planning based on user or administrator defined workload requirements.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The program code (software-based logic) for carrying out the method is embodied as part of the system described below beginning with reference to FIGS. 1–2. One aspect of the invention is embodied as a method that is described below with reference to FIGS. 4–12. Although, not limited to this theory, at least one basis of the invention relies on the inventor's critical recognition of the applicability of a particular utilization curve shown in FIG. 3. User Interface Screens for using the invention are shown in FIGS. 13–20.

Figure 1:
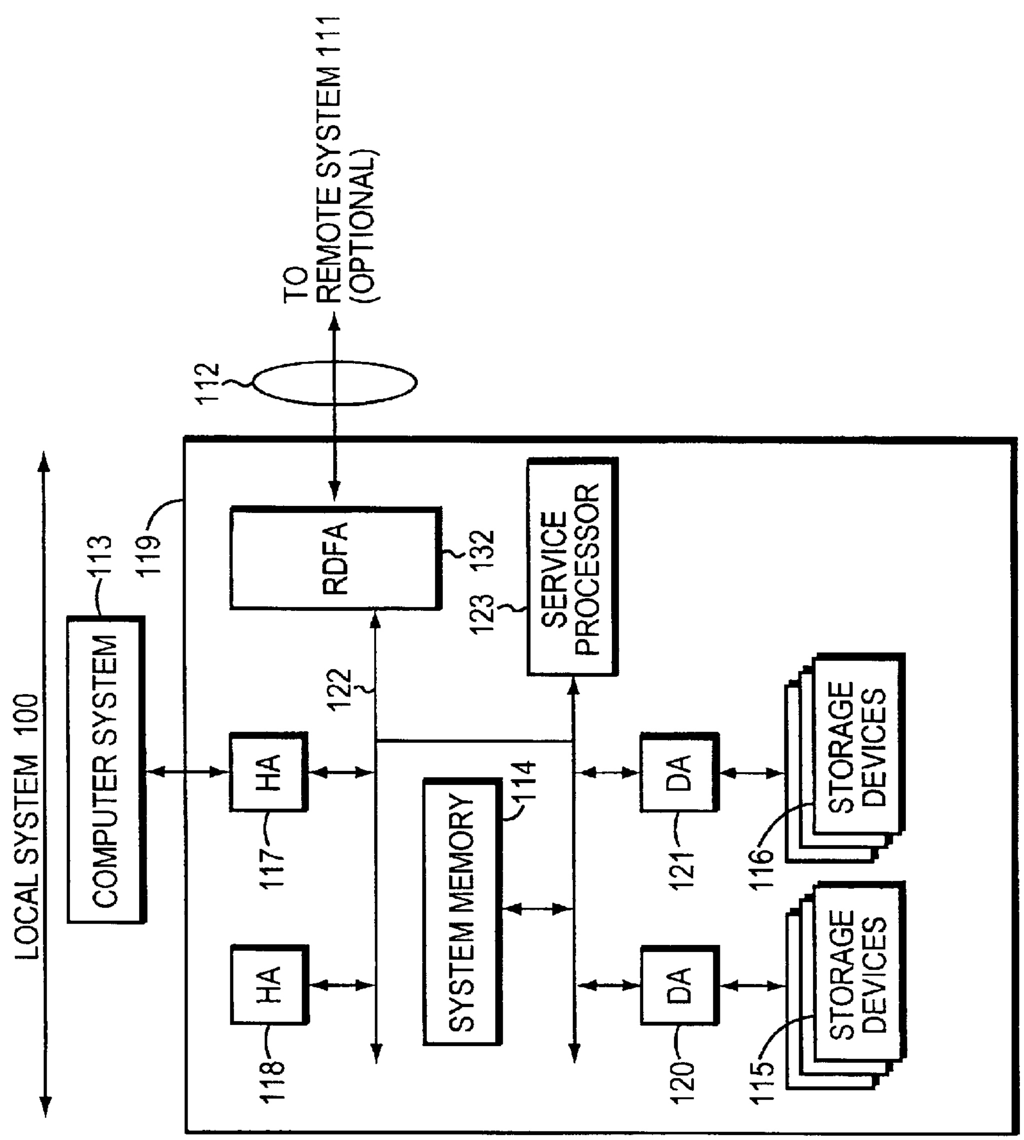
FIG. 1 is a block diagram of a data storage network for which Logic (FIG. 2) that is part of the computer system shown in FIG. 1 is particularly useful.

Referring now to FIG. 1, reference is now made to a network or local system 100 for which the invention is particularly useful and includes a data storage system 119 in communication with a computer system 113. Software-based logic for enabling the invention resides on computer 113 (FIG. 2). Although the computer system is shown conveniently in communication with the data storage system this is optional because the invention is particularly useful for planning and configuring such a data storage system pre-operationally.

In a preferred embodiment the data storage system to be configured is a Symmetrix Integrated Cache Disk Arrays available from EMC Corporation of Hopkinton, Mass. However, it will be apparent to those with skill in the art that there is no limit to the use of this invention for any system including data storage. Nevertheless, regarding the preferred embodiment, such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

The data storage system 119 includes a system memory 114 and sets or pluralities 115 and 116 of multiple data storage devices or data stores. The system memory 114 can comprise a buffer or cache memory; the storage devices in the pluralities 115 and 116 can comprise disk storage devices, optical storage devices and the like. However, in a preferred embodiment the storage devices are disk storage devices. The sets 115 and 116 represent an array of storage devices in any of a variety of known configurations.

A computer or host adapter (HA) 117 provides communications between the host system 113 and the system memory 114; disk adapters (DA) 120 and 121 provide pathways between the system memory 114 and the storage device pluralities 115 and 116. Regarding terminology related to the preferred Symmetrix system, from the HA toward the computer or host is sometimes referred to as the front end (FE) and from the DA's toward the disks is sometimes referred to as the back end (BE). A bus 122 interconnects the system memory 114, the host adapters 117 and 118 and the disk adapters 120 and 121. Although not shown such a bus could be used with switches to provide discrete access to components of the system 119. Communication link 112 may provide optional access through remote data facility adapter (RDFA) 132 to remote system 111 (not shown). Remote systems and related adapters are discussed in the incorporated '497 and '939 patents.

Each system memory 114 and 141 is used by various elements within the respective systems to transfer information and interact between the respective host adapters and disk adapters. A service processor 123 may also be used in communication with system memory 114 particularly for maintenance and service needs.

Figure 2:
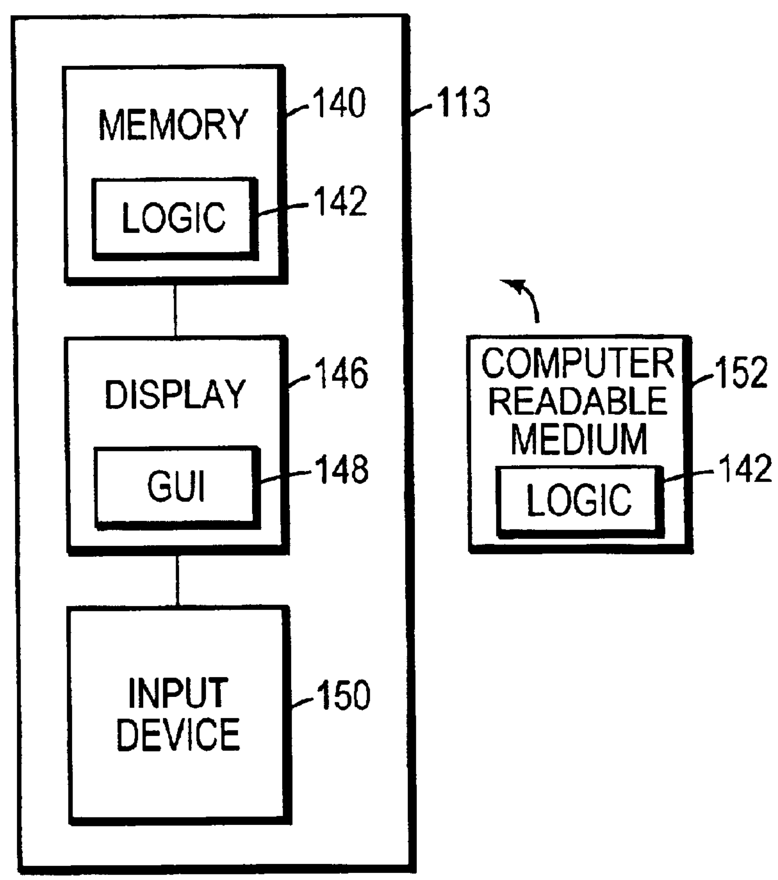
FIG. 2 shows the computer system of FIG. 1 including the software-based logic of the preferred embodiment and including a computer-readable medium encoded with the logic for enabling the method of the present invention.

FIG. 2 shows a general purposed digital computer 113 including memory 140 (e.g., conventional electronic memory) in which is stored Program Code or Logic 142 that enables the method of the invention (FIGS. 4–12) and enables display of user screens on display 146 to comprise GUI 148. In general, Logic 142 is preferably software-based logic or program code as discussed above. The general-purpose digital computer becomes a specialized unique and novel machine because of Logic 142, which in a preferred embodiment is software but may be hardware. Logic 142 may also be stored and read for operation on computer readable medium 152. A user input device, such as a well-known mouse or keyboard allows the user to interface with the computer including its special logic.

Figure 3:
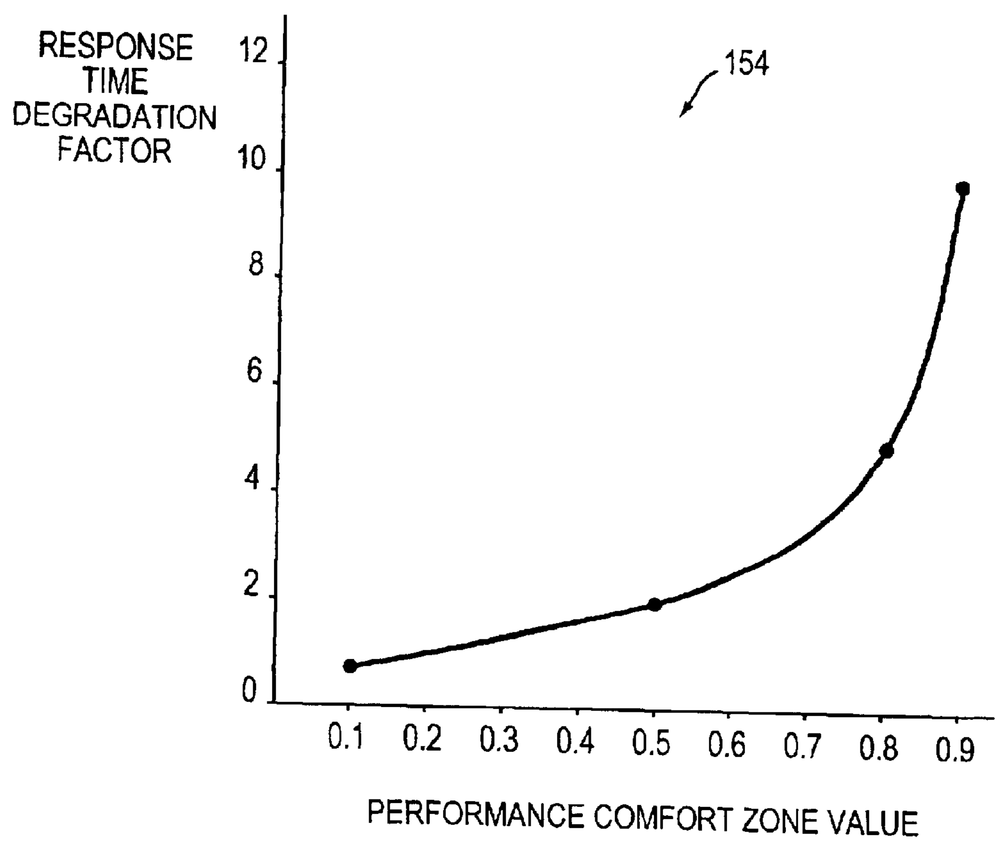
FIG. 3 is an exemplary representation of a relationship used with the logic of the preferred embodiment shown in FIG. 2.

FIG. 3 shows a graph of relationship 154 that illustrates a special utilization curve that the inventor has critically recognized to be an important tool for implementing the method of this invention. The ordinate or "y" axis shows Response Time Degradation Factor (RTDF) that is relative to time to service a request for a data operation. The abscissa or x axis shows a Performance Comfort Zone Value (Performance Zone or PZV) that is relative to the performance characteristics that user may desire for a data storage system (e/g., MB/sec data retrieval rates). The interrelationship of RTDF and PZV is important. For example, changing the PZV implies that the user would like the complement to be run at a higher utilization level. But the higher the utilization level, the higher the possibility of contention for the device and thus the higher the response times. Increasing the PZV will decrease the number of components in the configuration, thus reducing cost. On the other hand increasing the number of components will increase costs.

An Embodiment of Method Steps of the Invention

Now for a better understanding of an embodiment of method steps of this invention the steps are described in detail with reference to FIGS. 4–12, which are explained with reference to user interface display screens shown in FIGS. 13–20.

Figure 13:
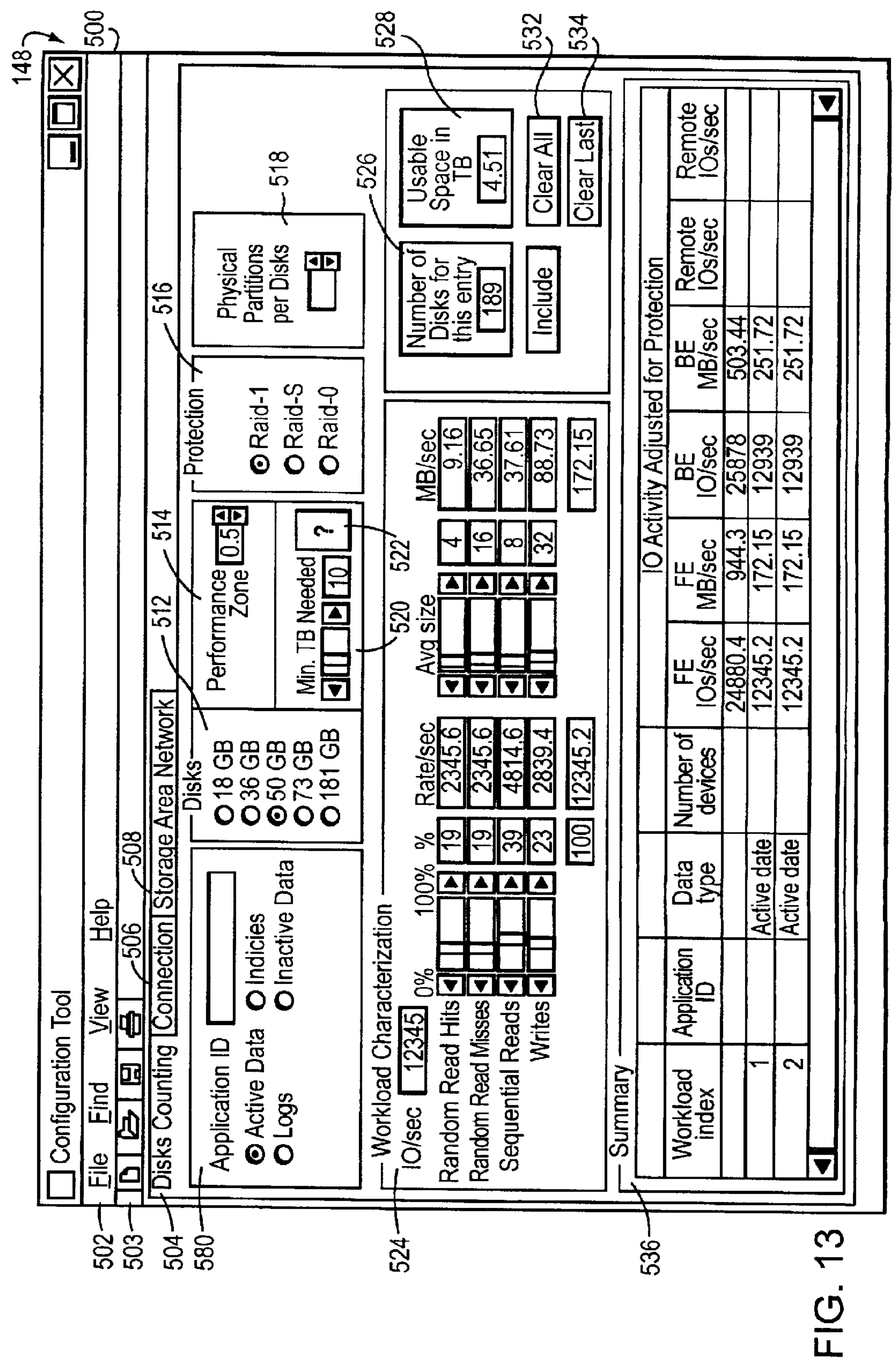
FIG. 13 is an exemplary representation of a user interface screen for allowing use of this invention.

Referring to FIG. 13, exemplary user screen 500 that is part of GUI 148 and maybe used by a user (not shown) to invoke and use the logic of the invention. Menu bar 502 includes the following functions: File, Edit, View, and Help. Graphical menu selections 503 include Open a New Document, Open a File, Save a File, and Print.

Tab 504 in this example is denoted as "Disks Counting." Information related to this tab is shown in FIG. 13. Tabs 506 and 508 refer to, respectively, "Connectivity," and "Storage Area Network," which are also discussed below.

Screen area 510 includes fields for entering Application ID, and fields for indicating "Active Data", "Indices," "Logs," and "Inactive Data." Screen area 512 includes fields for designating the data capacity of the disk drives to be used, e.g., 18 gigabytes (GB), 36 GB, 50 GB, 73 GB, and 181 GB. Screen area 514 includes an area to enter a Performance Zone Value discussed with reference to FIG. 3. Screen area 520 allows the user to directly indicate the minimum terabytes (TB) needed or desired and which clicking on and moving the slider button may adjust. Screen area 518 allows the user to indicate the number physical partitions per disk. Screen area 522 is a convenient help invoking icon specific to the screen area where user may be working and Screen areas 532 and 534, include respectively, a "Clear All," and "Clear Last" button.

Screen area 516 includes a field for the user to indicate the protection scheme to be used, e.g., Raid-1, Raid-S, and Raid-0, or others not listed in the example for the sake of simplicity. Raid protection schemes are well known, but for the sake of completeness are now discussed briefly. A paper from the University of California at Berkeley and entitled "A Case For Redundant Arrays Of Inexpensive Disk (RAID)", Patterson et al., Proc. ACM SIGMOD, June 1988, generally describes this technique. Raid-1 architecture is essentially well-known disk mirroring. In disk mirroring identical copies of data are sent to redundant or mirroring disks. Such disk redundancy provides robust protection but increases cost. On the other hand, Raid-0 provides no protection at all and adds no cost for redundancy. More advanced Raid schemes than Raid-1 provide bit striping and XOR calculations for parity checking. For example, EMC Symmetrix employs a Raid scheme known as Raid-S, wherein a parity calculation is based on an Exclusive Or (XOR) boolean logic function. The XOR instruction is used to compare binary values of two data fields. The result is then XOR'd with the binary values of data that produces resultant parity binary value. Then a Raid rebuild may use the XOR to reconstruct the missing data.

Referring again to FIG. 13, the user may use Workload Characterization screen area 524 to indicate type and/or size of traffic, e.g., IO's per second. Type of traffic may include random read hits, random read miss, sequential reads, and writes. A write operation means data is requested to be placed on the disk whereas a read operation means data is requested to be viewed but not changed and typically this involves loading from disk or electronic memory such as cache. Such cache or system memory is often employed to avoid mechanical lags associated with actual disk reads or writes. A random read hit means that data requested to be read from a random request was found in cache. On the other hand a random read miss means the data was not found in cache in response to a similar request. Sequential reads refers to a situation where a read request following an immediate preceding request is for data stored on disk in an immediately following sequence such as a data block. In such a case, cache can be used quite effectively to avoid going to disk, in particular by pre-fetching a certain amount of sequentially arranged data from disk into cache.

The invention uses such information to advise a user on how to configure data storage systems having good capabilities to meet his needs, and while also considering traffic, other workload characteristics, and user defined Performance Zone Values. The invention allows for the integration of space and traffic needs of a business along with performance goals such that the resulting configuration can handle the workload in a manner that meets a desired quality of service.

Returning again to FIG. 13, screen area 526 indicates the number of disk for the entry defined by the workload characterization and other information given. Screen area 528 defines the usable space in terabytes based on these other variables and parameters just discussed. Conveniently screen area 536 provides a summary. The IO activity is adjusted for the protection scheme selected using screen area 516. Summarized information may include data type, traffic requirements such as high as per second and performance characteristics such as MB per second for both front end (FE) and back end (BE), which are characteristics of the preferred data storage system and EMC Symmetrix.

Figure 4:
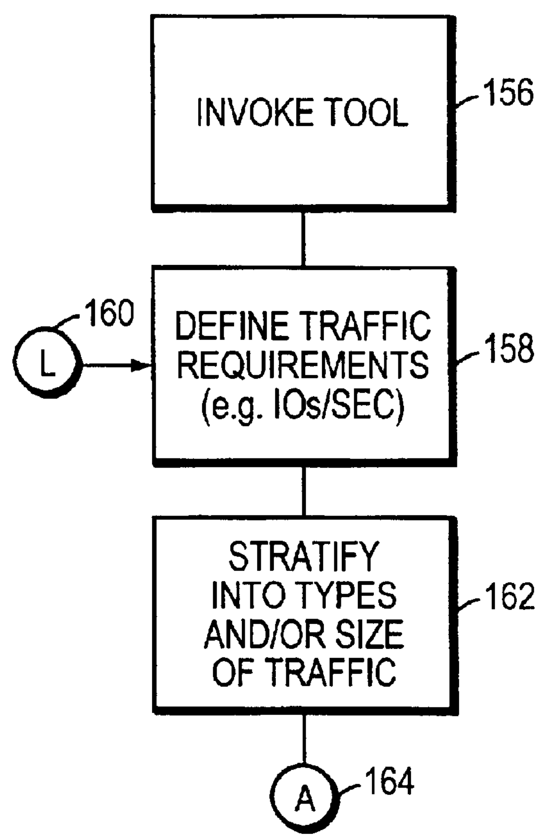
FIG. 4 is a flow logic diagram illustrating some method steps of the invention carried out by the logic of this invention.

Referring to FIG. 4, step 156 invokes for operation of the Logic of FIG. 2. In step 158, the user uses the GUI 148 to define traffic requirements, e.g., IO's per second. This can be done either as a bulk IO requirement or as the IO requirements decomposed into individual applications, threads, volume-groups, or any other logical separation of work into business units available to the user. The IO rate assigned to a business unit is then stratified into the types and sizes of the traffic in step 162. Disk counting, i.e., allocating and accounting for disks needed for such stratifications is also performed by the Logic. Step 160 "L" shown in FIG. 4 is invoked in accordance with answers to inquiries posed as part of the steps described with reference to FIG. 11 below. Continuation step 164 "A" flows into FIG. 5—shown steps.

Figure 5:
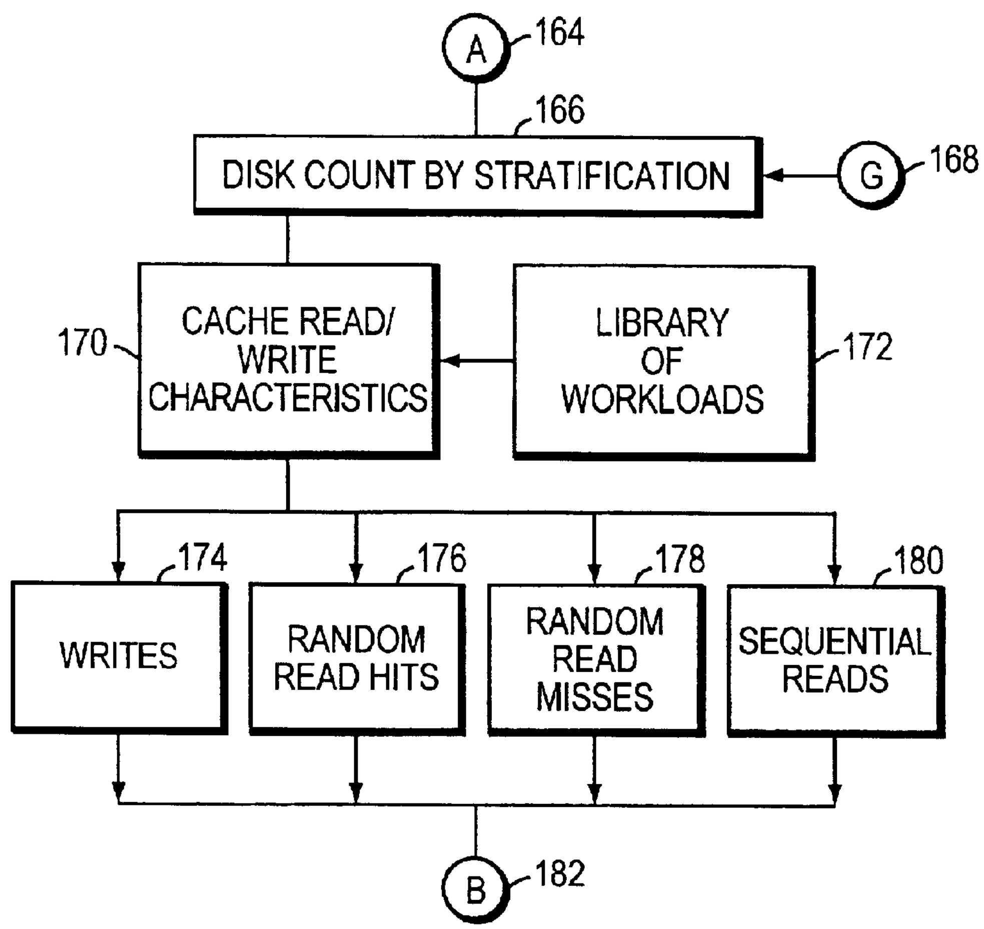
FIG. 5 is another flow logic diagram illustrating method steps of the invention carried out by the logic of this invention.

Reference is now made to FIGS. 5 and 14. In using the invention, the user needs to provide through the user interface information identifying what percent of this work is Random-Read Hit, Random-Read Miss, Sequential Read and Write (discussed below). FIG. 14 shows an enlargement of screen area 524, including random Read Hits field **524*a*, Random Read Miss field 524*b*, Sequential Reads field 524*c*, And Writes field 524*d*. One approach to establishing these percentages is to first determine the Read/Write ratio as one way to establish Read/Write Characteristics (FIG. 5, step 170). The user may determine this from knowledge of the application transactions or from a Workload Library (FIG. 5, step 172**).

Once this ratio is established the user may attempt to determine what portion of the read activity is sequential. Sequential reads are generally almost 100% cache hits unless they come in bursts of small sequences. Again, this requires knowledge of the application or information from a Workload Library. Of the remaining reads, it is a good choice to select as a first approximation to a 25% hit rate to random read activity. A distinct IO size can be assigned to each type of IO of the business unit. Upon starting an entry for a business unit the reminder to include this work in the total summary table is done by highlighting the 'Include' button 538 (FIG. 13) in a preferred embodiment.

Referring to FIG. 14, the sliding scale from zero percent to 100 percent allows the user to vary the parameters discussed above (such as Random Read Hits). Given the workload characterization IO's per second (12345 IO's/sec in this example) and using the percentage ratio, the Logic can determine the rate per second for each operation. For example if Random Read Hits are 30 percent of the IO traffic rate than the rate per second for random read hits is 3703.5 in this example (0.3 times 12345). This type of information is conveniently presented to the user via user screen 500 (FIG. 13). Also the logic determines the average I/O size in kilobytes and the transfer rate in MB per second.

Referring to FIG. 5, continuation step "A" 164 flows into step 166 that is a disk count by stratification. This includes cache Read/Write characteristics in step 170 that may come from library workloads shown in step 172 and discussed above. This leads to steps 174, 176, 178, and 180, respectively including the above-discussed Read/Write Ratio, Random Read Hits, Random Read Miss, and Sequential Reads user defined stratifications. Step 168 "G" shown in FIG. 4 is explained with reference to FIG. 11 below. Continuation step 182 "B" flows into the FIG. 6—shown flow logic diagram.

Figure 6:
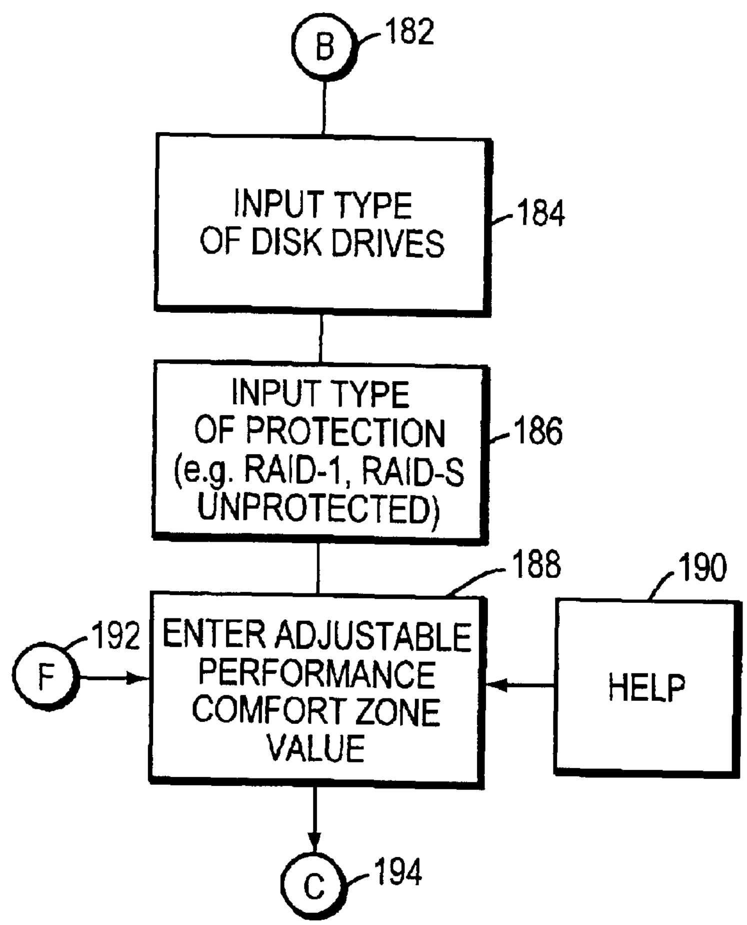
FIG. 6 is another flow logic diagram illustrating method steps of the invention carried out by the logic of this invention.

Referring to FIG. 6, the user may include type of disk drives in step 184 using the GUI. And in step 186 the type of data protection is selected, e.g., Raid-1, Raid-S, or Raid-0, as discussed above. The adjustable PZV zone step 188 can be performed using screen area 514 (FIG. 13). A related Help function for this step or using this screen area may be invoked in step 190 which is discussed below with reference to FIG. 16. Step 192 "F" is explained with reference to FIG. 7 below. Continuation step 194 "C" flows into the FIG. 7—shown flow logic diagram.

Figure 7:
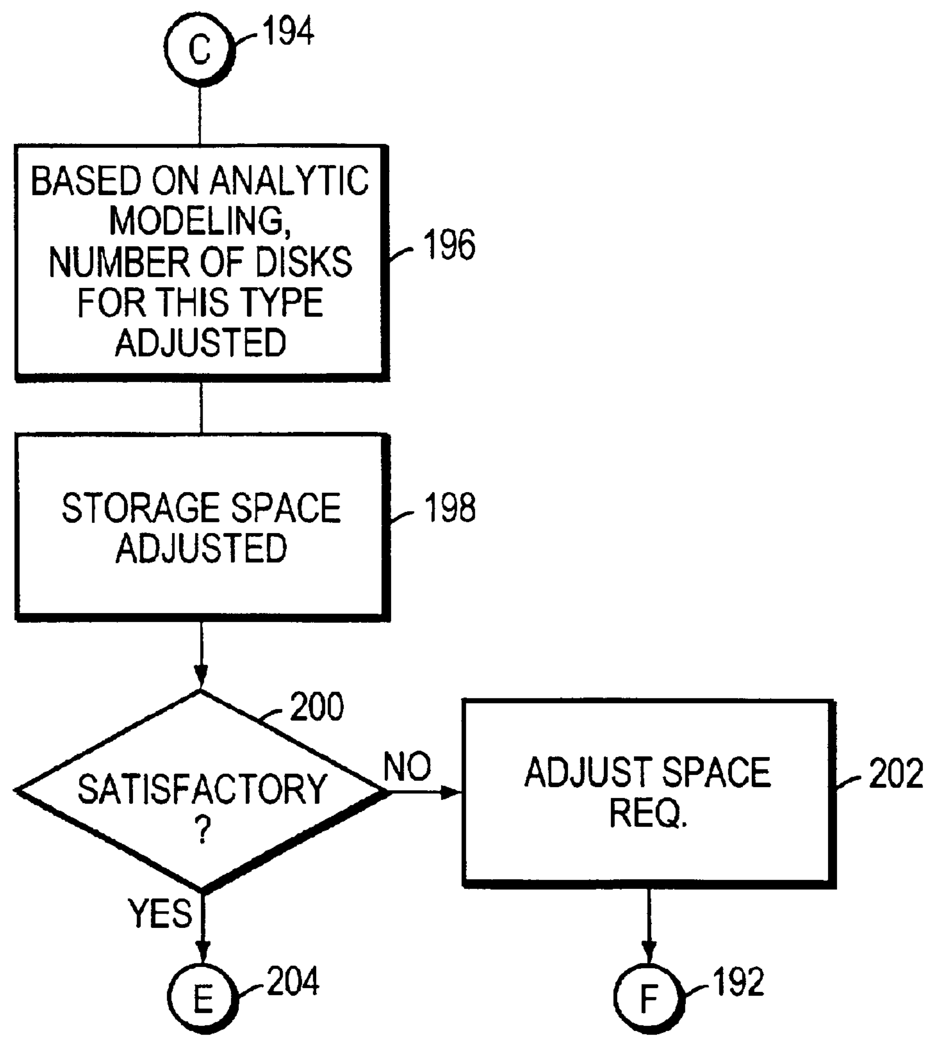
FIG. 7 is another flow logic diagram illustrating method steps of the invention carried out by the logic of this invention.

Referring to FIG. 7, step 196 provides the number of disks needed for the stratification based on analytical modeling. In step 198, the storage space is accordingly adjusted. If the space recommended is not satisfactory to the user than processing flows to step 202. In step 202, the user is allowed to adjust the space requirement and than processing flows into step 192 "F." If this is satisfactory to the user, then in accordance with answering "Yes" to the query in step 200 then processing flows to continuation step 204 "E," which flows into the FIG. 8—shown flow logic diagram.

Referring to FIGS. 15 and 17, an example of some user choices as described with reference to FIGS. 4–7 is now given. In this example 181 GB has been selected for disk type in screen area 512, a Performance Zone Value of 0.5 has been selected in screen area 514, and a protection scheme of Raid-1 has been selected in screen area 516 (FIG. 15). Such a scenario, would lead to an output of exemplary calculated results shown in FIG. 17 at user screen display area 526 and 528, respectively yielding 158 disks and usable space of 13.96 TB.

Continuing with this example and referring to FIGS. 18–19, the user may find this unacceptable and may adjust the minimum TB needed in screen area 520, for example, 18 TB as shown in FIG. 18. This will result in a new display of Screen area 526 and 528, respectively, of 204 disks and 18.03 TB (FIG. 19).

Figure 16:
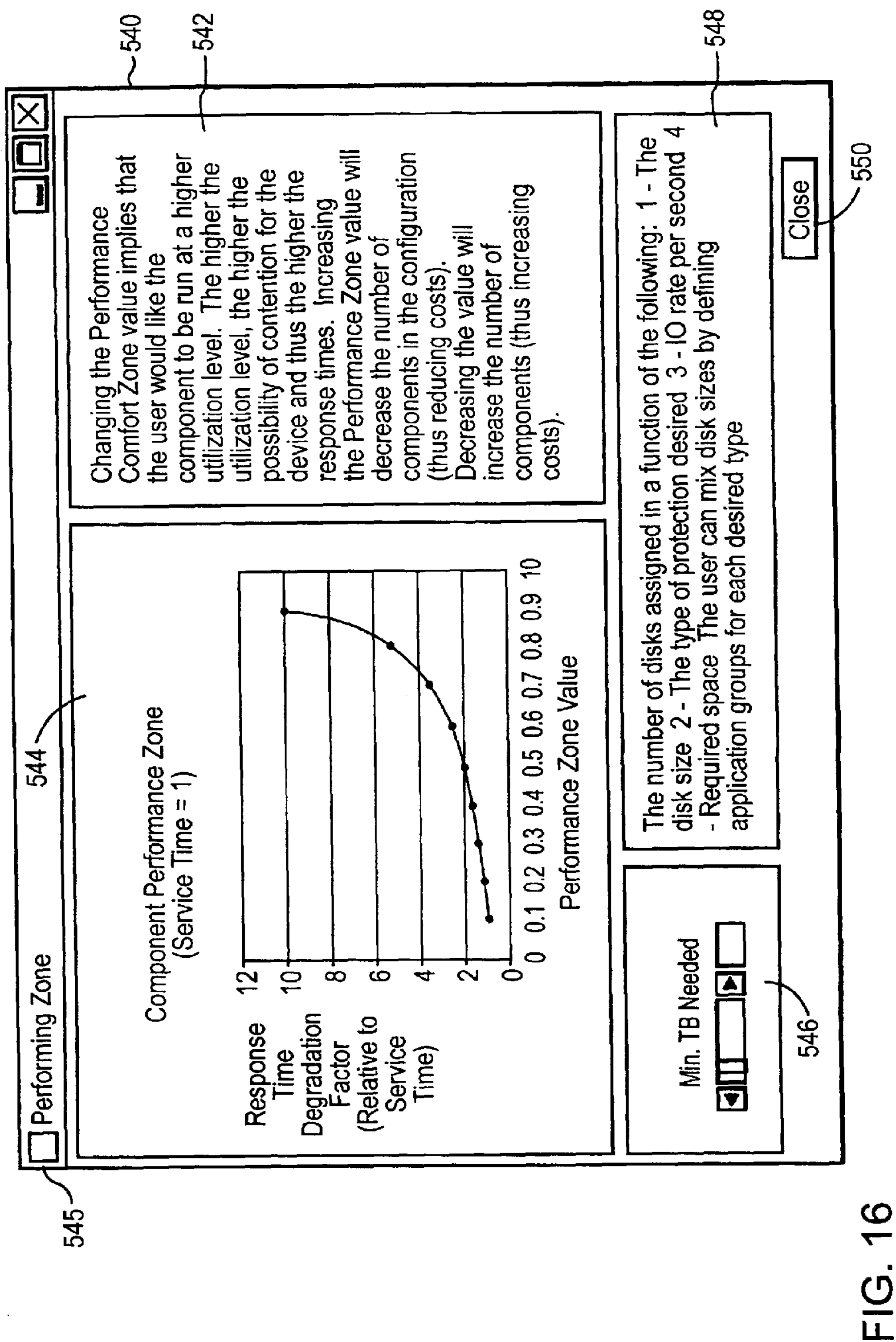
FIG. 16 is another exemplary representation of a user interface screen for using this invention.

Referring to FIGS. 15 and 16, if the user is new or otherwise requires help using the software tool of the invention, he may invoke Help by pressing screen area 522 displayed as a "?" button. He will then see a helpful presentation, for example such as FIG. 16 that shows screen 540 including a title area 545 (here entitled "Performance Zone," because that is where the user is working and the help is area specific). Screen Area 542 explains the relationship of the PZV and RTDF in economic and component terminology. In this example, help display area 544 shows the user the utilization that is a mathematic relationship used by the Logic of this invention. In this example screen area 546 explains the minimum storage space, here designated in TBIn area 548, for example it is explained to the user that "(t)he number of disks assigned as a function of the following: 1—the disk size; 2—the type of protection desired; 3—I/O rate per second; 4—required space; and the user can mix disk sizes by defining application groups for each desired type. The Close button 550 closes the Help function.

Figure 8:
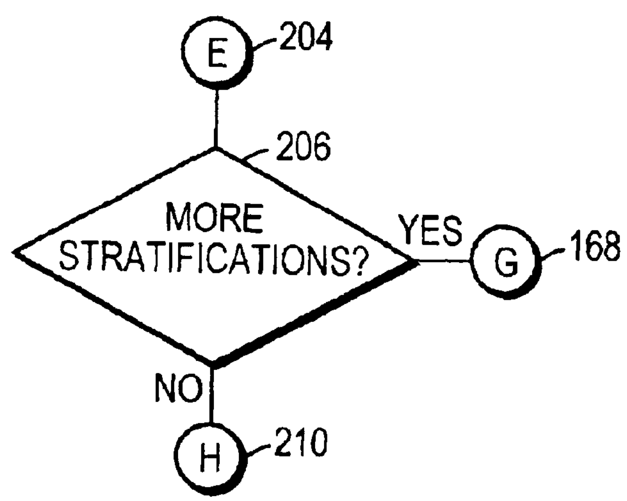
FIG. 8 is another flow logic diagram illustrating method steps of the invention carried out by the logic of this invention.

Referring to FIG. 8 and explanation of the method steps now continues. Continuation step 204 "E" flows into inquiry step 206. The inquiry is whether there are more stratifications to count. If "Yes," processing flows into step 168 "G." This flows back into the continuation of step G at 168 (acting, so to speak, as a "GO TO G") of FIG. 5. Processing then picks up again at Step 166 (FIG. 5) and continues disk counting by stratification, placing the answer for the stratification proceeding in the summary table shown at screen area 536 (FIG. 13). Such disk counting continues until the answer to query step 206 is "No." In this case processing flows into continuation step 210 "H," which flows into the FIG. 9—shown flow logic diagram.

Figure 9:
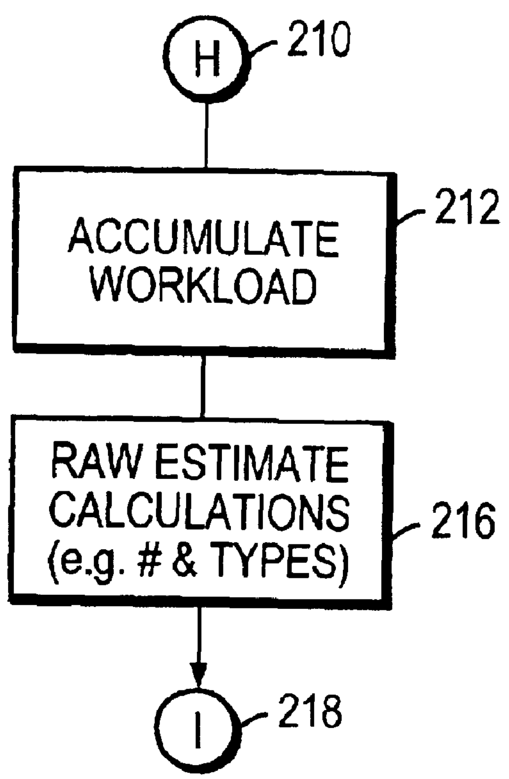
FIG. 9 is another flow logic diagram illustrating method steps of the invention carried out by the logic of this invention.

Referring to FIG. 9, once all the stratifications are accounted for the workloads are accumulated in step 212. They are sorted by type in step 214 and the results placed in the Summary table in displayed at screen area 536 (FIG. 13). Raw estimate calculations based on this information, such as a number of disk and types thereof are given in step 216. Then, continuation step 218 "T" flows into the FIG. 10—shown flow logic diagram.

Every time the user presses "Include" at screen area 538 (FIG. 13) the summary table at screen area 536 gets updated with the entries of the new business unit. The first line in the summary table is the sum of each of the entries for that particular column. After all business units have been included the disk counting of the exercise is complete. The information from the disk calculations is then transferred to the Connections page via "Connectivity" tab 506 described below where the data storage system such as the preferred Symmetrix systems can be configured.

Figure 10:
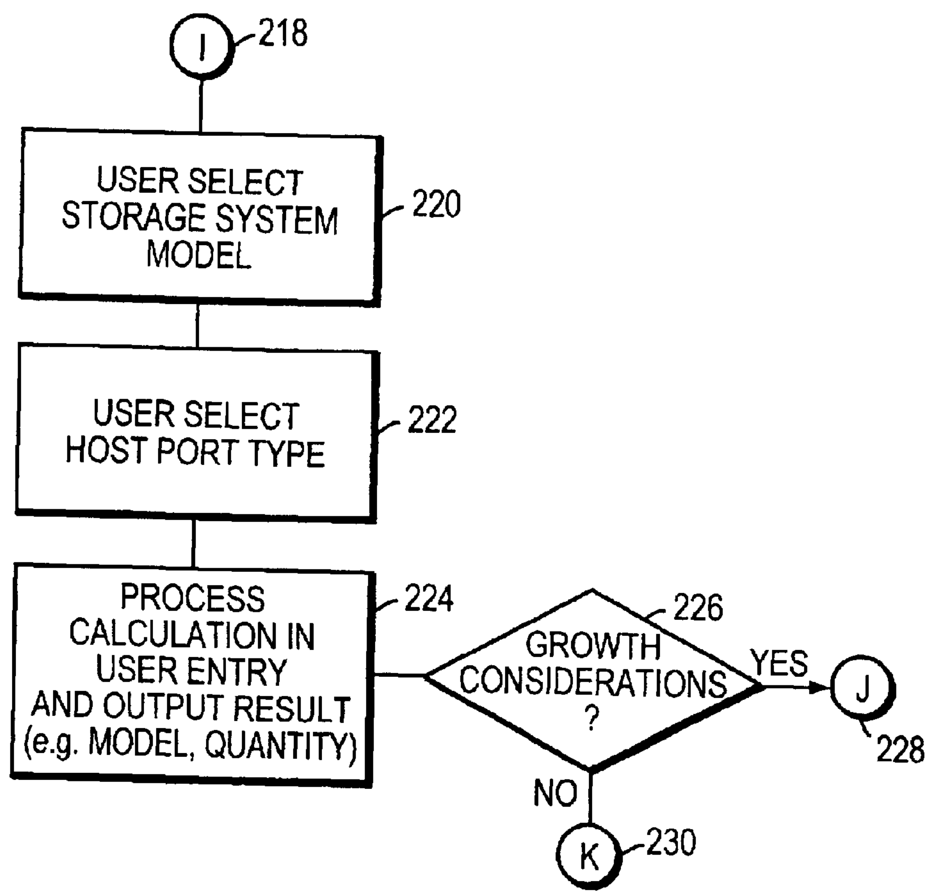
FIG. 10 is another exemplary representation of a user interface screen for allowing use of this invention.
Figure 20:
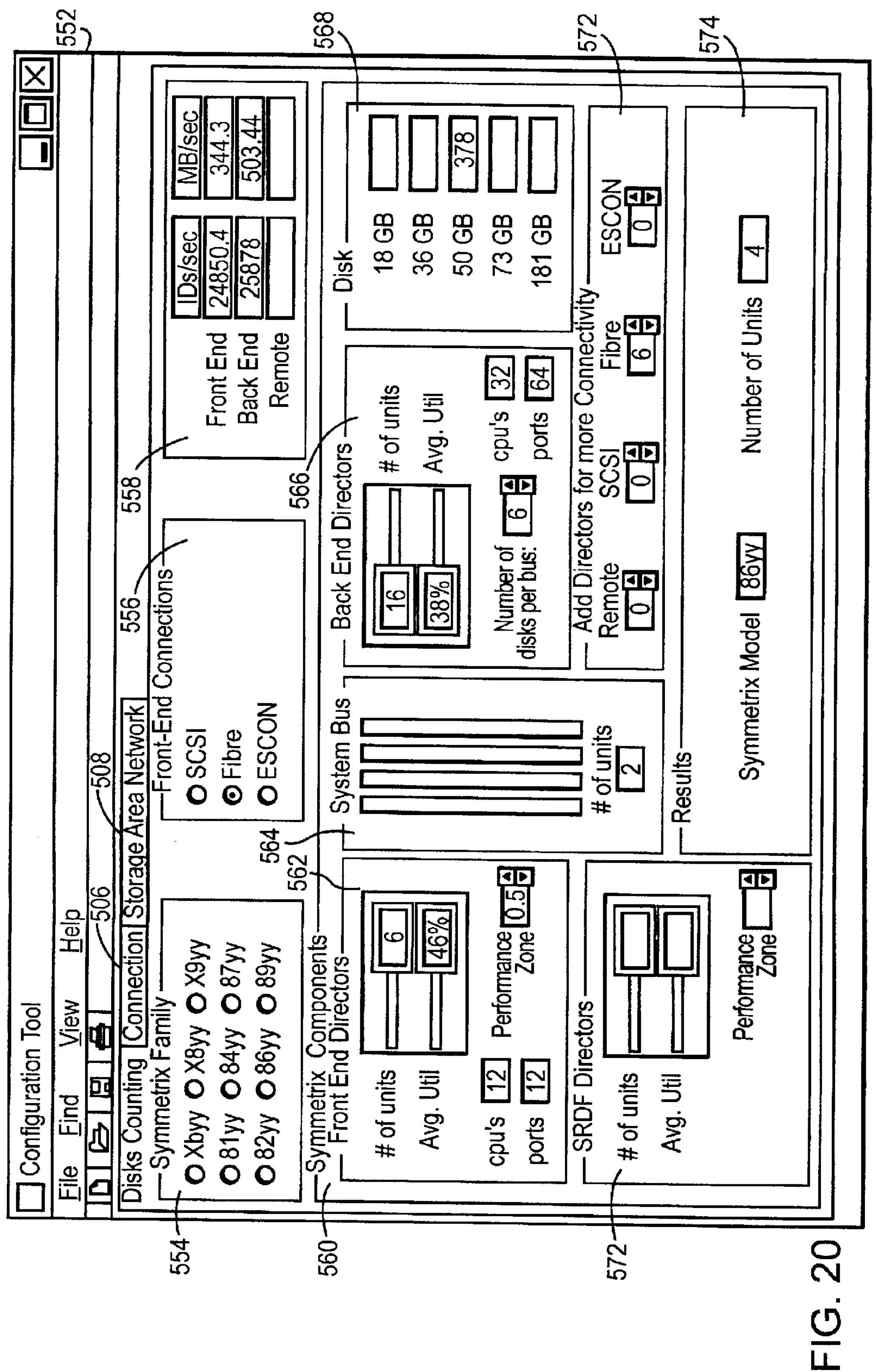
FIG. 20 is another exemplary representation of a user interface screen for using this invention.

Referring to FIGS. 10 and 20, the user may use the connectivity tab to then configure a data storage system, such as the preferred EMC Symmetrix system, based on the results. The user may select the appropriate model of data storage system in step 220 based in those presented in screen area 554 (FIG. 20). Based on the answers in the calculations the user is presented with the best choice for data storage system such as an EMC Symmetrix 86yy model. Next, in step 222, the user may select the port type, for funding connections, such as the well-known SCSL, or Fibre for Fibre for Channel or ESCON for a mainframe in screen area 556. Next, in step 224, the logic processing calculation in the user entry and gives an output result. Step 226 (FIG. 10) is an inquiry to determine if there are further data storage growth considerations for the user. If the answer is "No" processing flows to step 230 "K." if the answer is "yes" processing flows to continuation step 230 "J", which flows into the FIG. 11—shown flow logic diagram.

Based on the user activity and calculations, a summary of the IO and throughput activity is presented from the Disk Counting page in the screen area 558. The logic of the invention calculates the amount of work done on the front-end and back-end of the data storage system, in this example, the preferred Symmetrix. Using these numbers together with configuration selections the number of Symmetrix is calculated and the number and type of front-end ports is presented. The user selection begins with the Symmetrix family and model that is desired in screen area 554. Next, the user selects front-end port types in screen area 556. The results are presented in screen area 574.

These results take into consideration the performance constraints of the various components of the Symmetrix within each family, calculate the number of components requires and determine the architecture of each preferred Symmetrix model and build the required number of machines for the prescribed workload. In addition, the user is able to modify the count of ports and directors in order to accommodate other needs such as redundancy, future growth or to account for uneven distribution of work, wherein the Logic compensates by calculating a totally balanced system. The number of back-end directors is calculated based on the number of required disks. There are physical limits to the number of disks that a back-end port can accommodate, depending on the preferred Symmetrix model. Sizing here is based on the maximum number of disks allowed per port.

In the preferred embodiment, for front-end directors the constraining components are the port and the CPU. Once again, utilization is presented as the maximum of either the port or the CPU. Generally speaking there is an inverse relationship between the two with respect to utilization. Large IO sizes dominate the port and as a result there are fewer of them and thus the utilization of the CPU is low. On the other hand, small IO sizes present the CPU with more activity but don't task the port as much. The user is able to adjust the maximum utilization level of the front end in a fashion similar to the disks.

As the number of front-end directors is calculated the value is transferred to the window in screen area 562. Here the user is able to manually add front-end directors of any type for reasons other than base performance sizing. The total of the directors in this window will then influence the total number of preferred Symmetrix systems configured.

Figure 11:
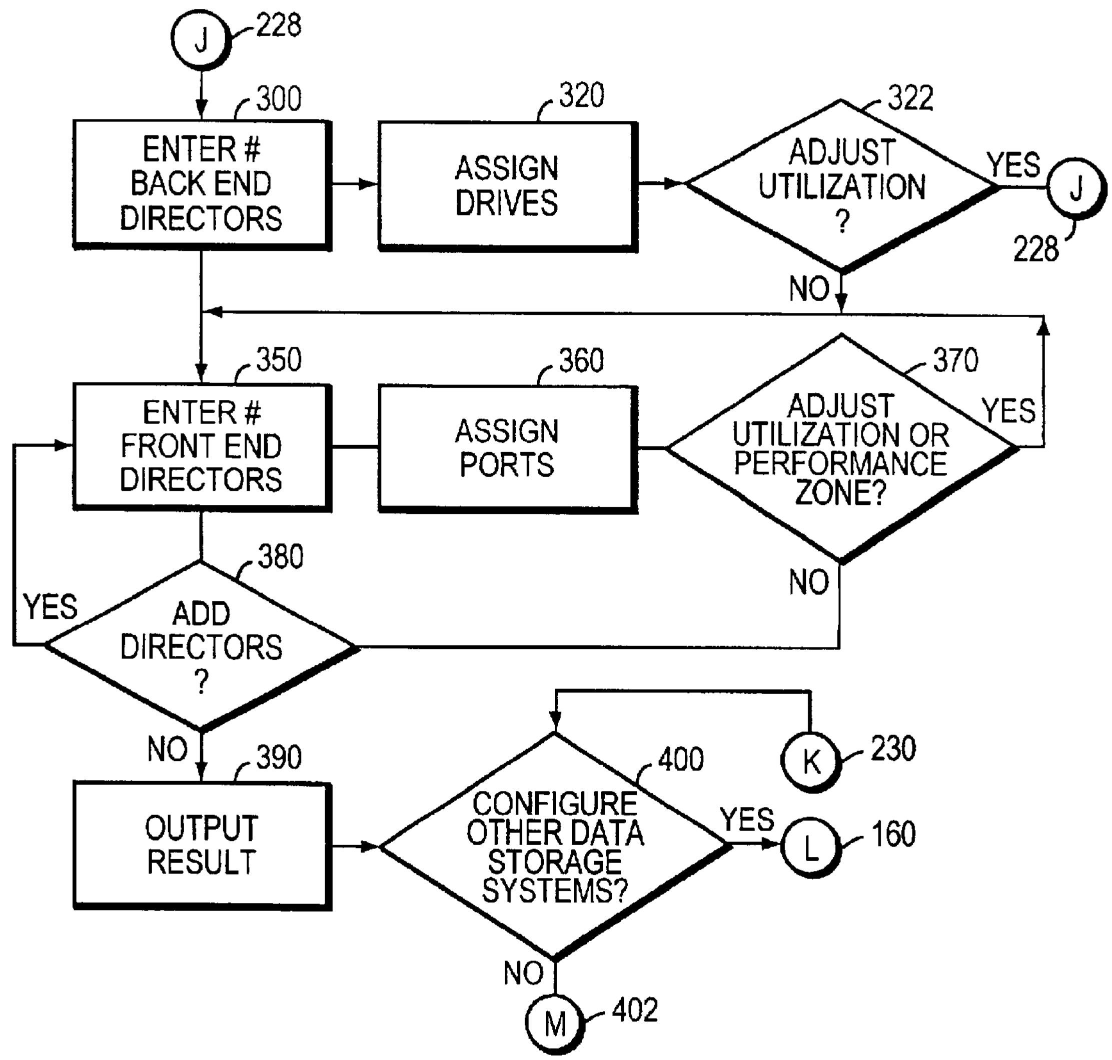
FIG. 11 is another flow logic diagram illustrating method steps of the invention carried out by the logic of this invention.

Referring to FIGS. 11 and 20, step 300 allows the user to enter the number of back end directors using screen area

566. In step 320 drives are assigned to the back end directors. Such drive assignments may be performed using screen area 566 and 568. The utilization may be adjusted in step 322, which is adjustable in screen area 566. If it is adjusted, then processing flows back again into step 300 for repetition of steps 300–322 until the answer is "No", in which case processing flows into step 350.

If it is not adjusted or adjustments are complete then in step 350 the user may enter the number of front-end directors in screen area 562. The number of ports may be assigned in step 360 also using screen area 562. The utilization of the Performance Zone may be adjusted in step 370. If either is adjusted, then processing flows back again into step 350 for repetition of steps 350–370 until the answer is "No," in which case processing flows into step 380.

If more directors are to be added per the query of Step 380, then processing flows back once again into step 350 for repetition of steps 350–370 until the answer is "No", in which case processing flows into step 380, and this loop is repeated until the number of directors is complete. The result is output to the user in step 390 via screen 552 (FIG. 20). Also the query step 400 may be reached via step 230 "K" which was based on a query posed in step 226.

Figure 12:
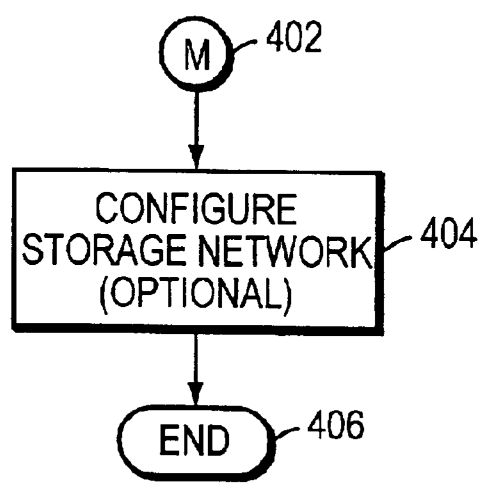
FIG. 12 is another flow logic diagram illustrating method steps of the invention carried out by the logic of this invention.

Reference is made to FIGS. 11 and 12 below. Referring again to FIG. 11, a query step 400 ponders whether other data storage systems are to be configured. If the answer is "Yes," then processing flows into step 160 "L" which in turn flows to step 158 (FIG. 4). The loop is continued until the answer to the query is "No," in step 402 "M" which continues to FIG. 12.

The user may use the data storage information in a cumulative fashion to configure storage networks using the "Storage Area Network" tab in which case other considerations including switches and gateways may also be considered (Step 404). The tool may of course include heuristic tools to adapt and learn to create solutions based on acquired processing and use. Processing ends in Step 406.

Figure 21:
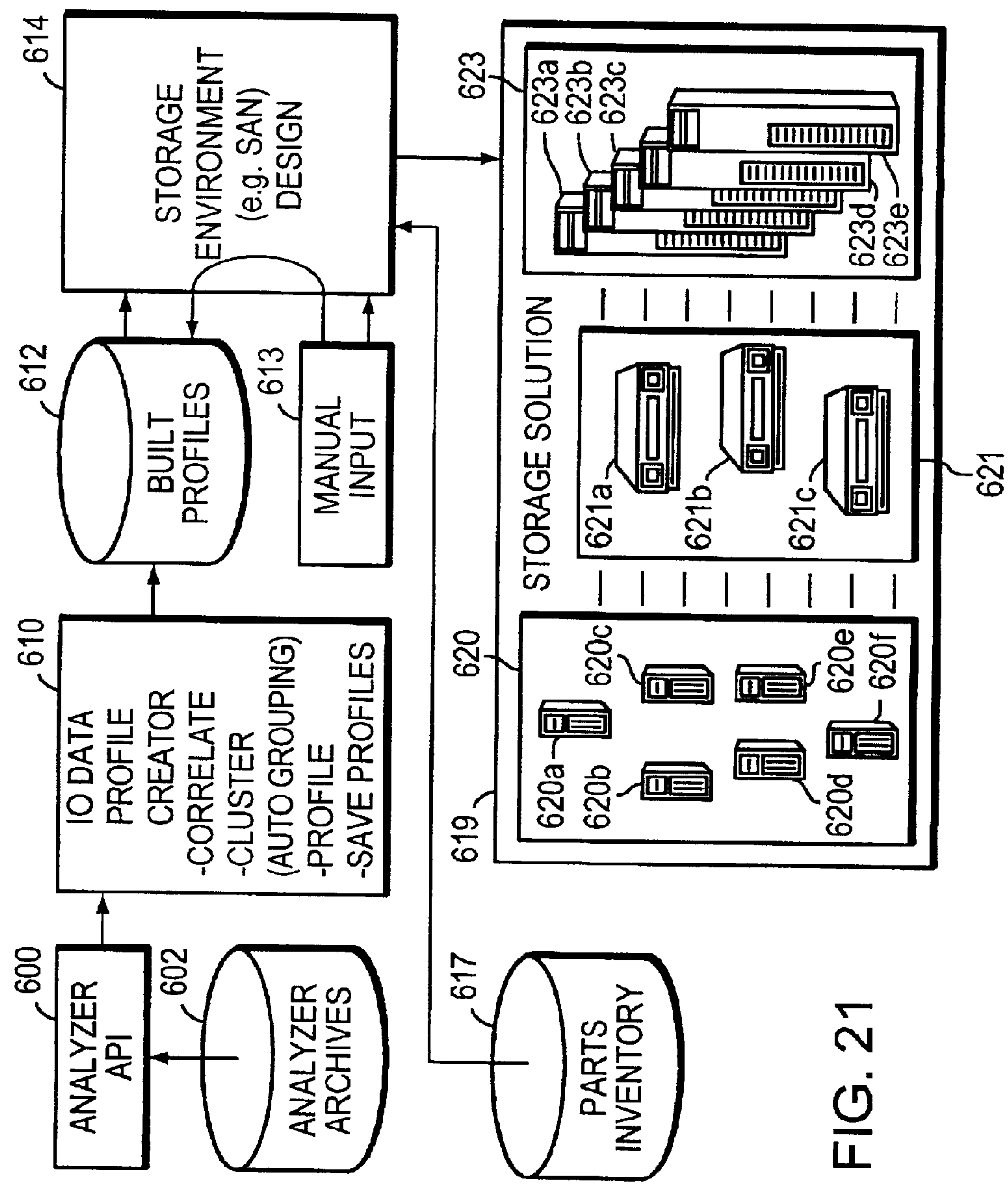
FIG. 21 is a block diagram of a system for creating profiles of IO data gathered by data analysis and which is useful for carrying out novel methods of this invention with the network and system of FIG. 1, or which may be used separate and apart from such a network and system.

Reference is now made to FIG. 21, which shows a schematic block diagram including a Profile Creator or Profiler 610 which receives analyzed IP data by communicating with analyzer application program interface (API) 600, which may receive data for analyzing from stored analyzer archives 602. The Profiler may be used for performing storage management functions. At a high level, the Profiler 610 creates workload profiles (WP's) by correlating the analyzed data, and clustering or grouping the data according to the correlation information. Generally, correlation refers to the degree of association between two or more quantities.

A correlation coefficient is a quantity that gives the quality of correlation of the original data, and is also known mathematically as the product-moment coefficient of correlation or "Pearson's correlation." It is well known mathematical principle that in a two-dimensional plot, the degree of correlation between the values on the two axes is quantified by the so-called correlation coefficient. Such a coefficient may be derived mathematically in various ways (see for example, the mathematical text Kenney, J. F. and Keeping, E. S. "Linear Regression and Correlation." Ch. 15 in *Mathematics of Statistics, Pt.* 1, 3rd ed. Princeton, N.J.: Van Nostrand, pp. 252–285, 1962).

Typically, the a value of "1" for a coefficient of correlation means that the data is correlated along a straight line (i.e. highly correlated), and on the other extreme a correlation of "0" indicates no correlation, while a value in would indicate a relative degree of correlation between those two extremes.

This invention uses such correlation principles in a new and useful way to provide significant advantages for the computer arts and in particular with regard to data storage. The Workload Profiler 610 is an automated tool that correlates workload data on a storage system, as collected and saved by analyzing tool such as the ECC Workload Analyzer from EMC Corporation of Hopkinton, Mass. The workload data may be IO data, or response time, on any other metric useful for measuring work in a storage environment. IO traffic is a basic indicator of work for a logical device, and response times may be used as a metric for identifying specific problem spots and correlate these problem spots with applications thus showing root-cause to application response time problems. However, one skilled in the art should recognize that there are many metrics that may be used, some of which may not even be foreseeable presently, for correlation.

Correlation may also be useful in the context of this invention for defining so called "affinity groups" of logical devices that are correlated. Logical devices are sometimes referred to as data volumes and generally refer to logical representations of physical volumes of data on a physical storage device. The incorporated '497 and '939 patents may be referred to further for more detail regarding such devices. Such correlated affinity groups can be stored and used to conduct trend analysis for capacity planning on a per-group basis. These same groups can also be fed back to the Workload Analyzer (e.g. ECC from EMC) and defined as a group to be used by other applications within the storage environment for advantages such as efficiency gains.

Referring again to FIG. 21, in general the components that cooperate with Profiler 610 may be similar or identical to like functioning components described above with reference to FIG. 1. Profiles are saved as Built Profiles 612 that may then be used for modeling capacity or otherwise for building a storage design such as storage area network (SAN) design 614. Such Profiles may be used individually or combined with manually inputted data 615 the Built Profiles with manual input data 615 and information from parts inventory 617 to arrive at a Storage Solution system 619. That system may include various capacity storage units; such as units 620 and 623 comprising grouped units 620*a–f* and 623*a–e*, respectively networked with switch group 621 including switches 621*a–c*.

The created so-called WP's identify the characteristics of work being performed in the data storage environment, although it is contemplated that the WP's could be prophetic or modeling types used to arrive at useful results. One novel use of created WP's is the ability to identify characteristics of work being done that is centered on a specific application, such as a software application, or a more general task performed in the data storage environment.

Figure 22:
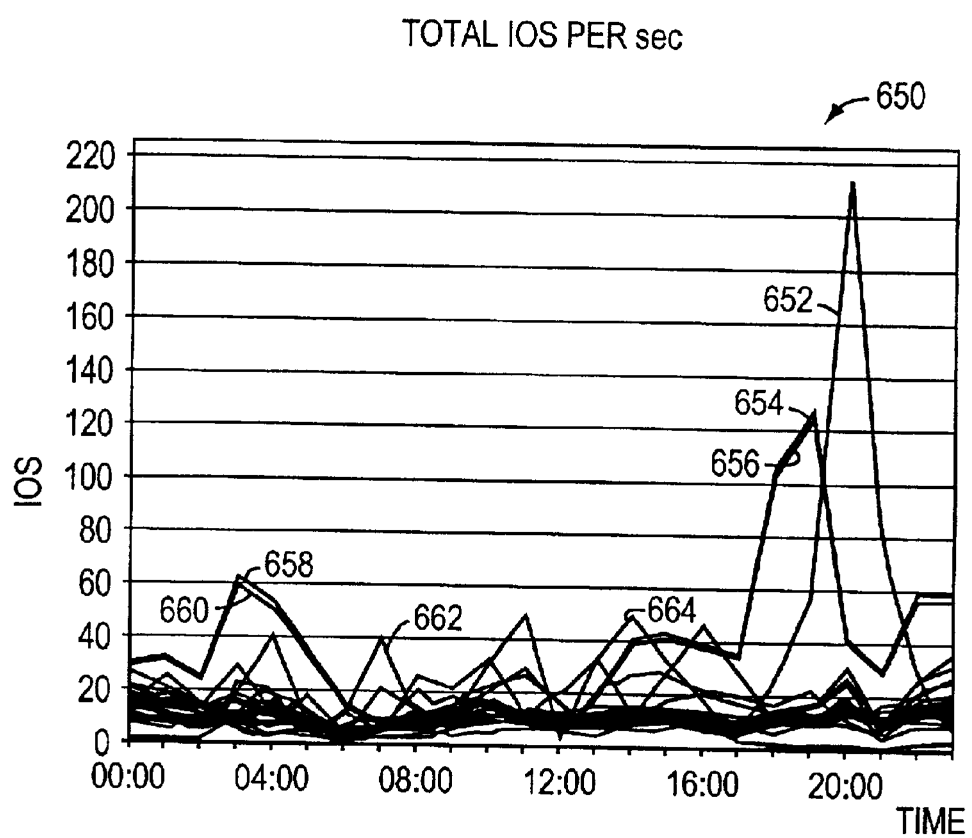
FIG. 22 is an exemplary representation of a user interface screen useful for implementing the methods of using the system of FIG. 21 and showing IO data that may be further analyzed and profiled by the system of FIG. 21.
Figure 23:
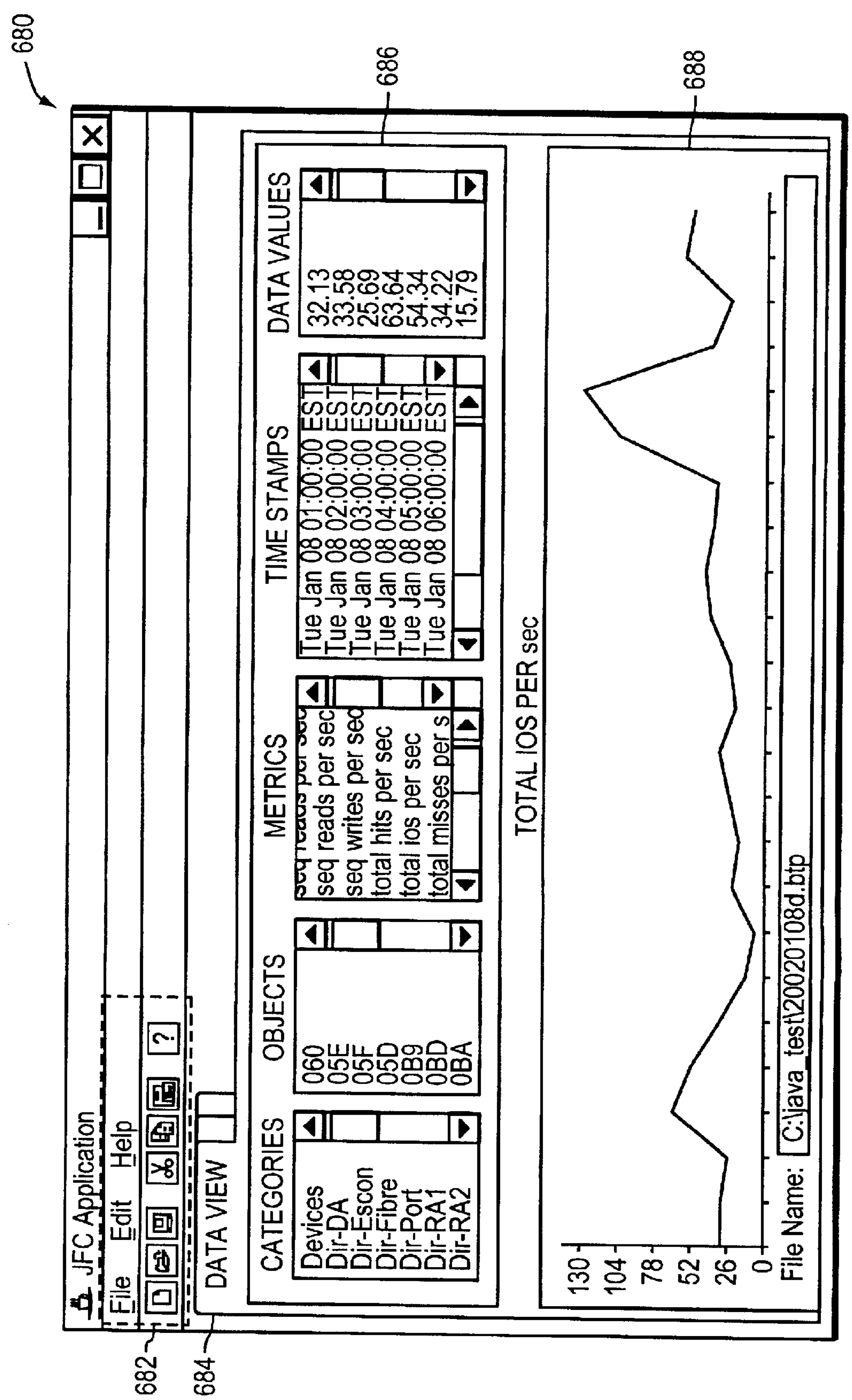
FIG. 23 is another exemplary representation of a user interface screen useful for implementing the methods of using the system of FIG. 21.

Referring to FIG. 22, an illustration of a general problem of interpreting or managing IO or workload data is shown: Graph 650 represents work characterized by profiles 652, 654, 656, 658, 660, 662, and 664 and including others shown but not labeled that is generated on a data storage system, such as the one shown in FIG. 1, over a 24 hour period by approximately 300 different storage devices. Each device includes data that represents a dataset addressed by some business application. The inventor has critically recognized that it would be advantageous to identify how many business applications are active and which devices are considered to be members of these applications, i.e., which devices include datasets address by particular applications. The inventor has further recognized that if such sets of devices are identified then these sets of devices can yield signatory profiles that can later be used for modeling various scenarios when considering alternative storage area network or SAN configurations.

Figure 24:
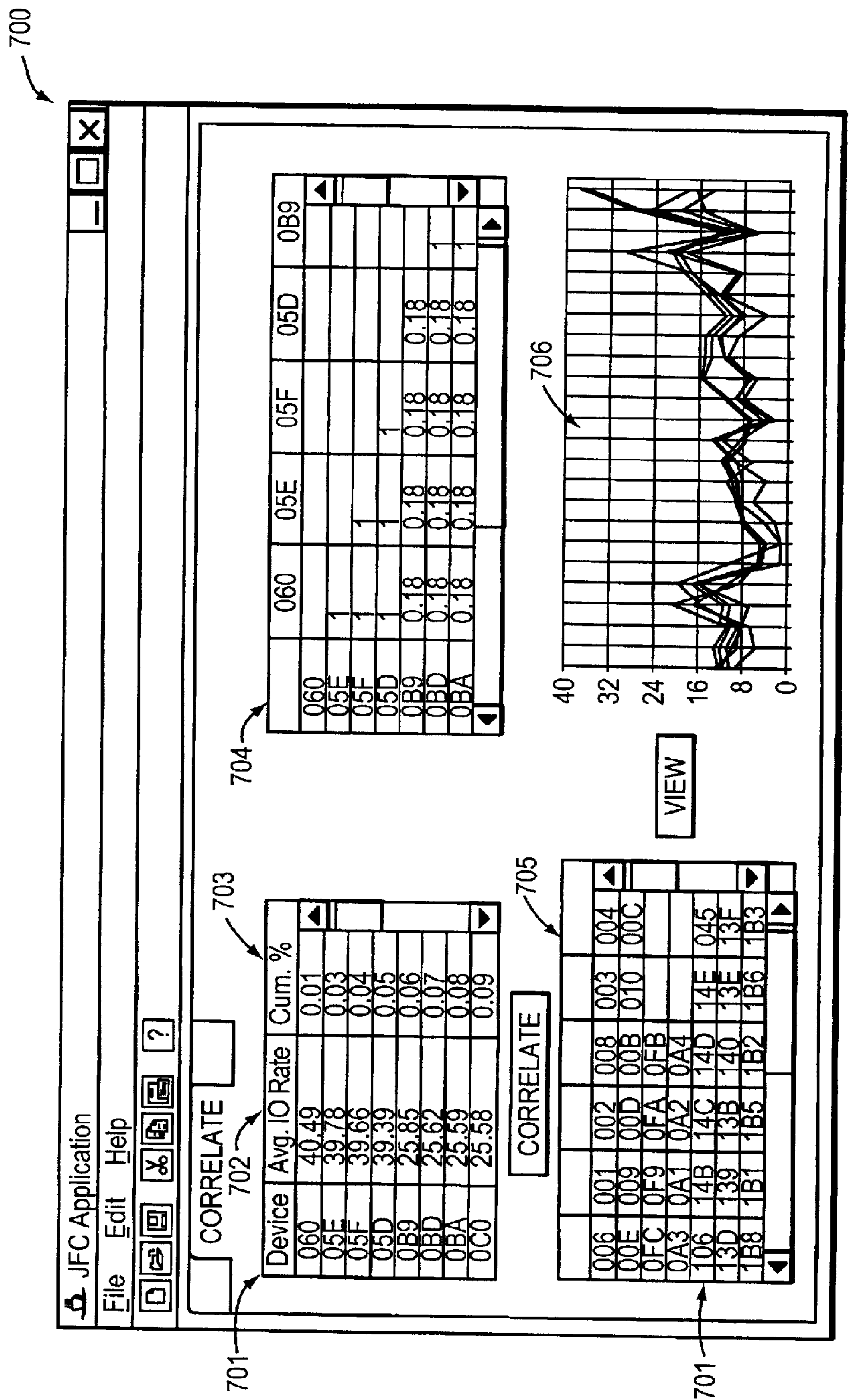
FIG. 24 is another exemplary representation of a user interface screen useful for implementing the methods of using the system of FIG. 21.

The Workload Profiler 610 analyzes files collected by the Workload Analyzer in the following way, and as shown in FIG. 24: It reads the workload data and selects all active devices shown in area 686. Metrics that preferably compose a workload profile are the following:

a–% Random Read Hits b–% Random Read Misses c–% Sequential Reads d–% Writes e–Average Read Size (in Kbytes)

f–Average Write Size (in Kbytes)

One skilled in the art will recognize that different or additional metrics may be saved for various reasons including getting finer resolution profiles but the ones above are useful as has been described above with reference to FIGS. 1–20 and are useful for modeling with modeler 614 (FIG. 21).

Again referring to FIG. 22, the initial screen 680 verifies the data for a user and allows such a user to view a graph of any selected metric displayed in area 688. Screen areas 682 and 684 include action bar menus and tab selections in a conventional fashion as known in the computer arts. Tab selections 684 allow the user to select from choices including Data View, Correlate, and Profile. The view shown on screen representation 680 is the Data View.

FIG. 24 shows a representation of the Correlate view on screen 700. The average IO rate is represented in column 702 and is used for sorting selected devices from high to low activity. The Profiler 610 calculates marginal contribution to total IO's by each of the devices shown in column 701 and which are also referred to as data volumes. It maintains a cumulative total for the IO traffic shown in column 703. This provides a parameter that allows the user to select the percentage of work that will be incorporated in the profiling process. For example, the user may choose 80% as the parameter setting. This will tell the Profiler's program to select the volumes that contribute to 80% the total work. Preferably, this selection maintains the sorted order from the busiest to the least busy device.

Referring again to FIG. 24, a correlation matrix is shown in area 704 and represents that which has been calculated by the Profiler for all the selected devices volumes that were chosen by using the cumulative value. The matrix provides the coefficient of correlation for each pair of devices. Area 705 shows a clustering process is that is applied to group together all devices selected from area 701 and that are correlated to each other with a coefficient that is equal to or higher than a provided threshold. The threshold is a parameter initially pre-set by the program but modifiable by the user. A higher or lower coefficient of correlation will provide different groupings for profiling. A parameter is available to the user to set the coefficient level. Screen 700 also may be used for viewing any specific workload cluster activity graphed in display area 706 by highlighting a row such as row 707 and pressing the View button.

Figure 25:
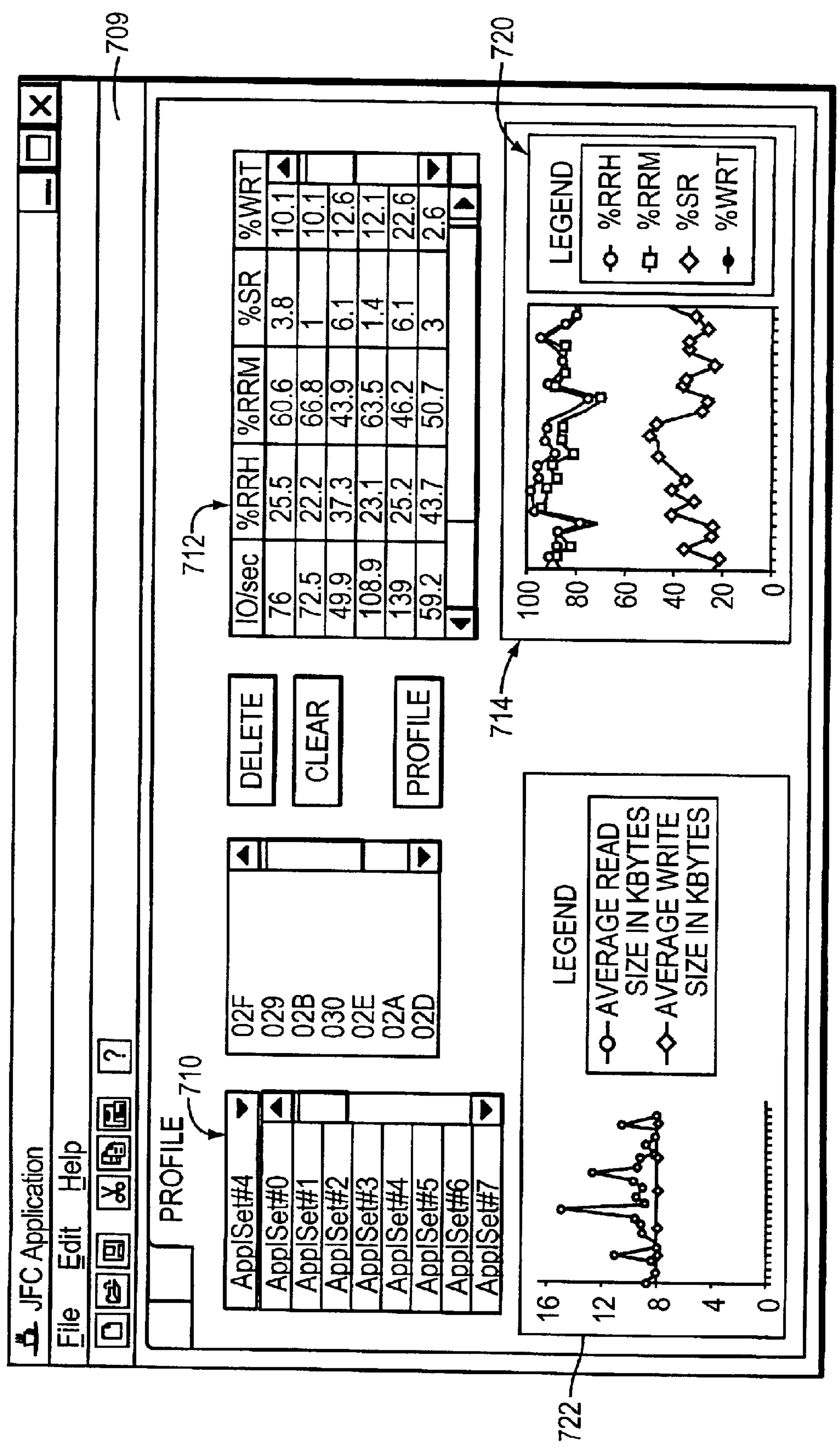
FIG. 25 is another exemplary representation of a user interface screen useful for implementing the methods of using the system of FIG. 21.

Reference is now made to FIG. 25 showing screen 709 that includes a display area 710 showing each set of correlated volumes (devices) that are identified and named and which naming labels may be used for performing actions and displaying information related to such sets. Upon selection of a set from area 710, the profile of the set is calculated and displayed in the table 712 as well as visually depicted in areas 720 and 722. The profiles can be saved such as in an XML file for use in the modeling tool 614 (FIG. 21).

Figure 26:
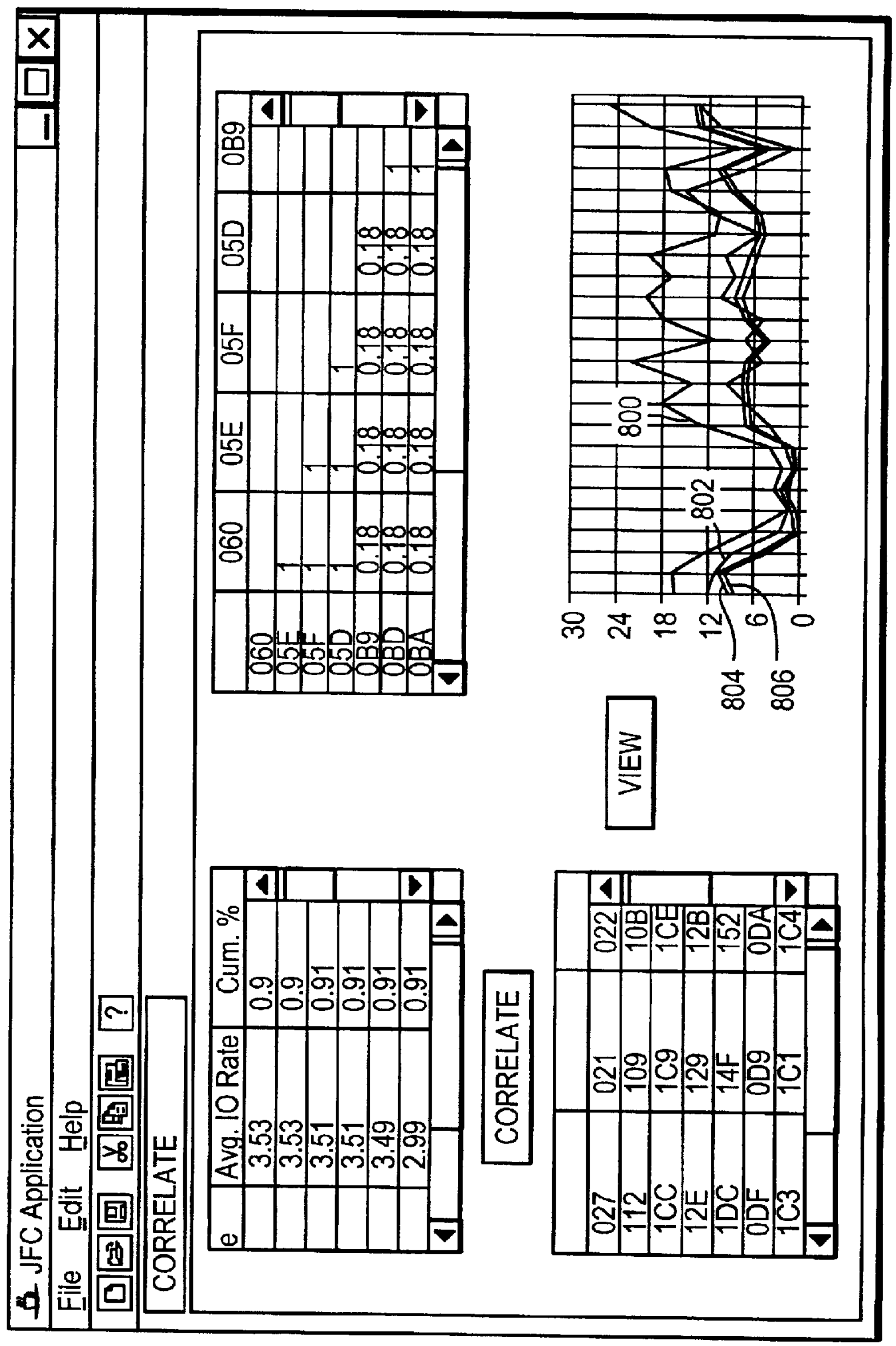
FIG. 26 is an exemplary representation of a profile of data created by the system of FIG. 21 using the methods of this invention and which is related to the data presented on the user interface screen shown in FIG. 22.
Figure 27:
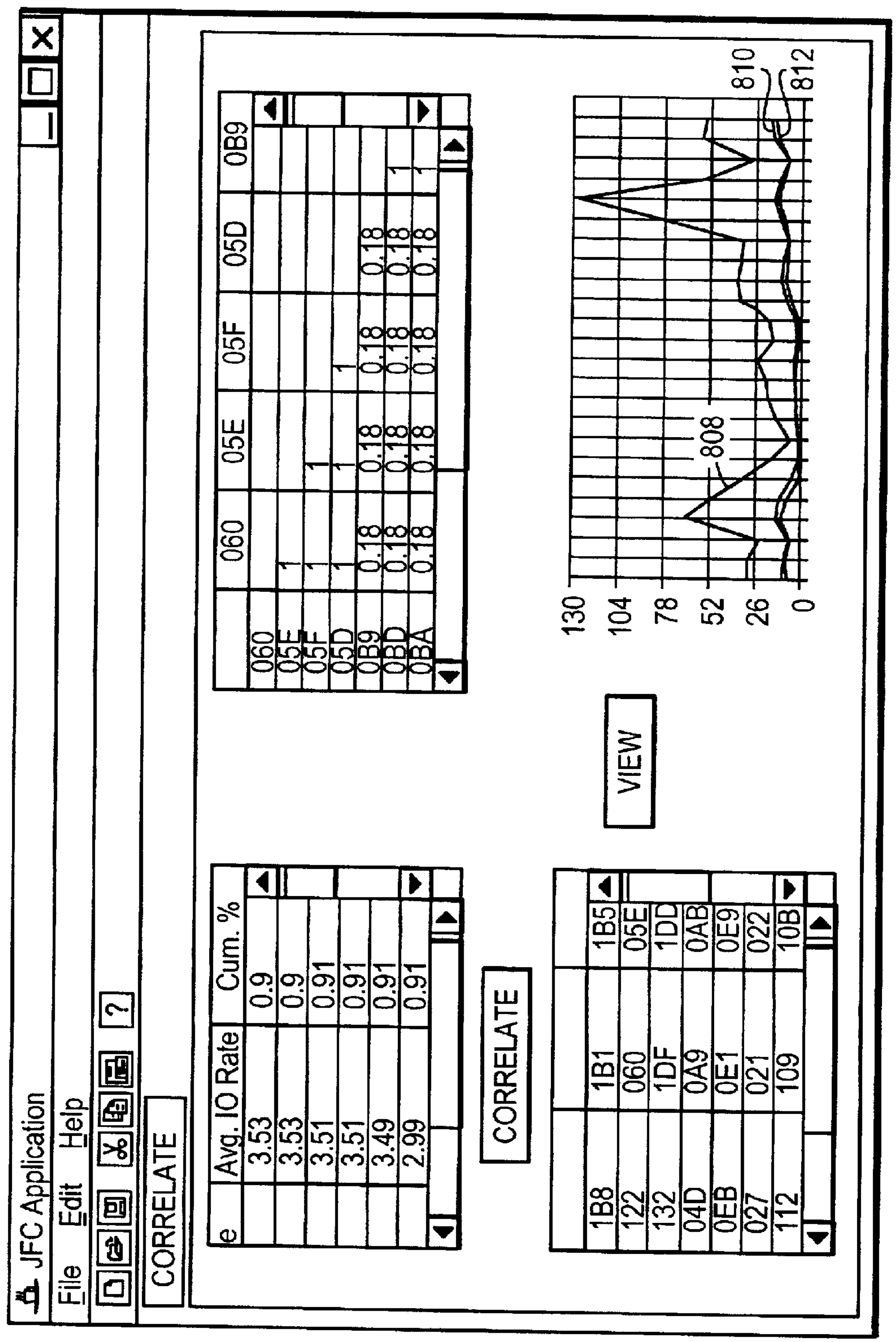
FIG. 27 is another exemplary representation of a profile of data created by the system of FIG. 21 using the methods of this invention and which is related to the data presented on the user interface screen shown in FIG. 22.

FIGS. 26 and 27, respectively, shown sets of correlated volumes which may be for example be related to specific business applications operating in the storage environment. For example FIG. 26 shows workload profiles 800, 802, 804, and 806 that represent correlated sets culled from the workload activity shown in FIG. 22. Similarly, FIG. 27 shows correlated device sets having workload profiles 808, 810 and 812 that have been shown via correlation calculations to be related to a different application operating in the analyzed workload traffic depicted in FIG. 22.

Figure 28:
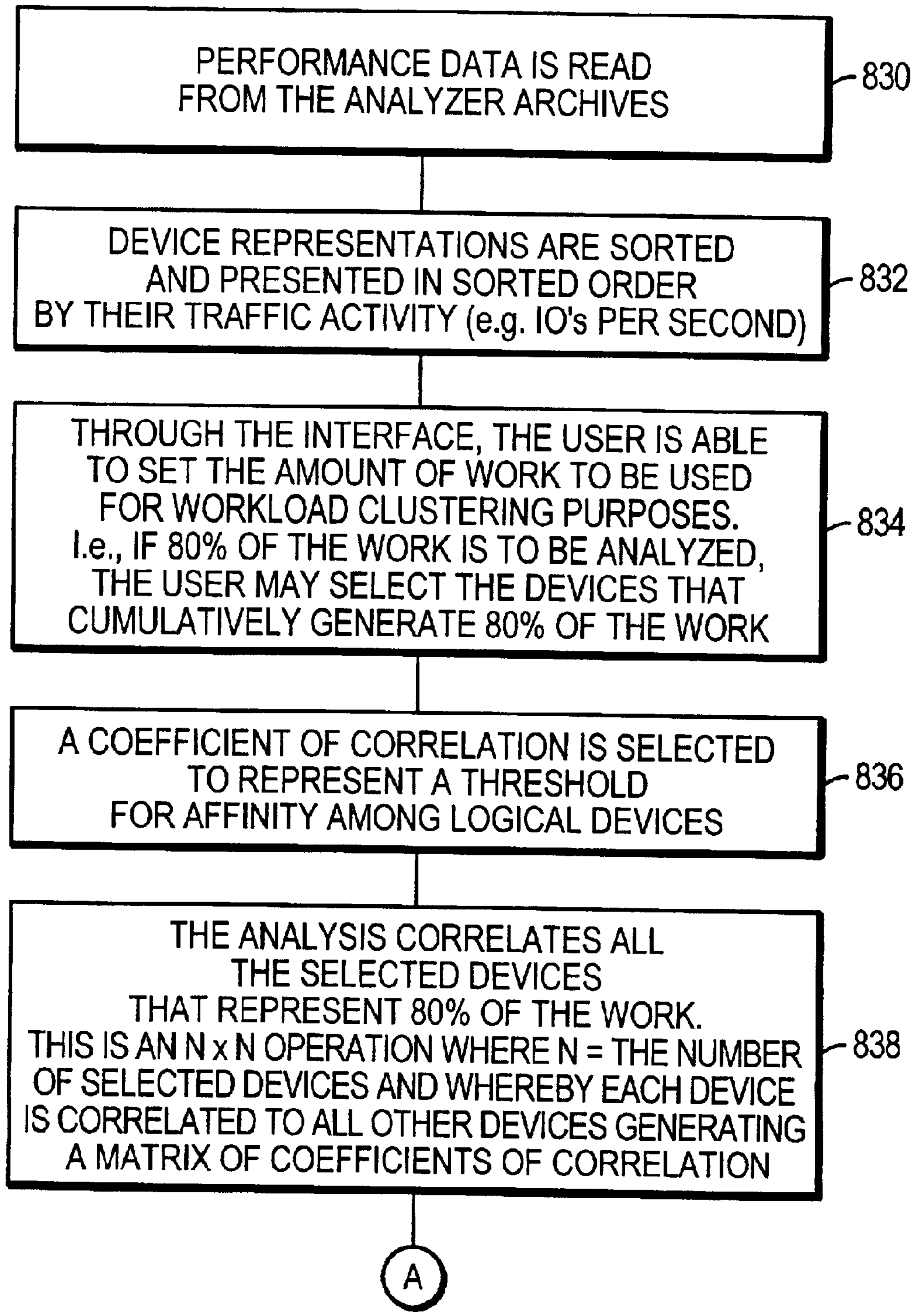
FIG. 28 is a flow diagram showing an example of using the system and method of this invention embodiment of the method of this invention.
Figure 29:
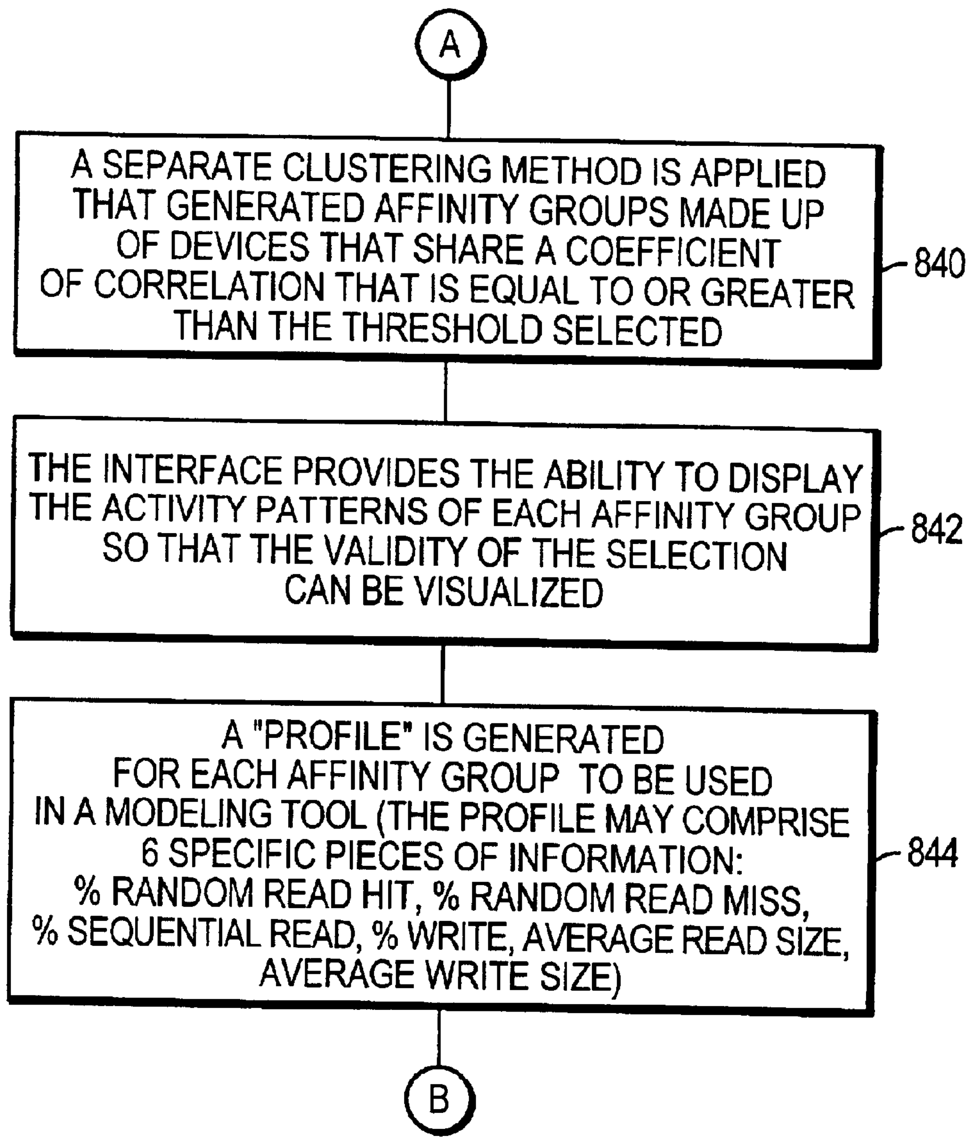
FIG. 29 is another flow diagram showing an example of using the system and method of this invention.
Figure 30:
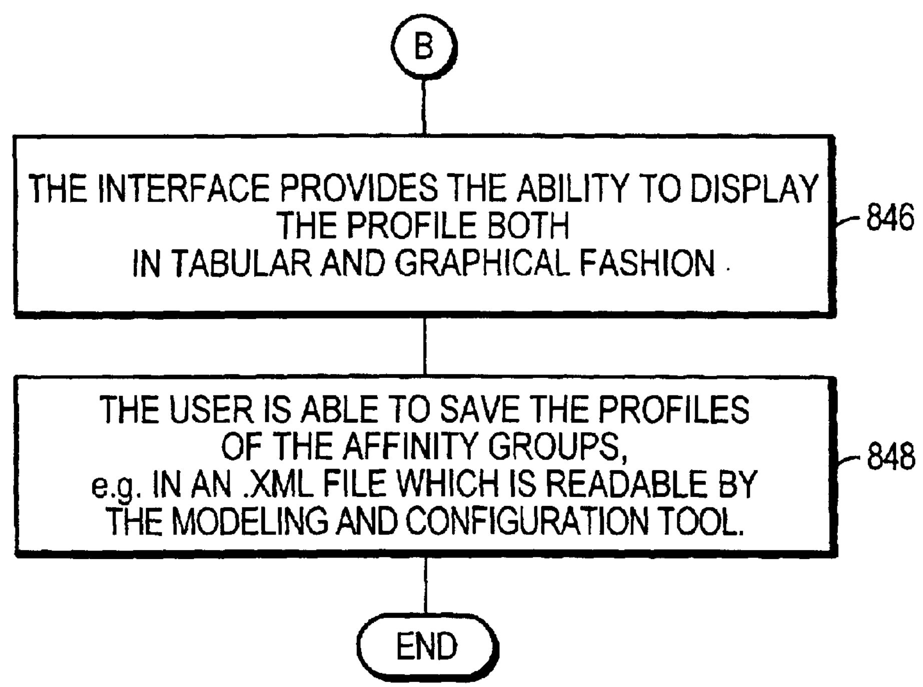
FIG. 30 is another flow diagram showing an example of using the system and method of this invention.

An overview of an example of implementing an embodiment of the method of this invention is shown in FIGS. 28–30. Referring to FIG. 28 In step 830 (FIG. 28), performance data is read from the analyzer archives (FIG. 21). Next in step 832, device representations are sorted and presented in sorted order by their workload characteristics like traffic activity (e.g. IO's per second). In step 834, through the interface, the user is able to set the amount of work to be used for workload clustering purposes. I.e., if 80% of the work is to be analyzed, the user may select the devices that cumulatively generate 80% of the work. Next in step 836, a coefficient of correlation is selected to represent a threshold for affinity among logical devices. In step 838, the analysis correlates all the selected devices that represent 80% of the work. This is an N×N operation where N=the number of selected devices and whereby each device is correlated to all other devices generating a matrix of coefficients of correlation. Connecting step A of FIG. 28 logically flows into identically labeled step A of (FIG. 29).

Referring to FIG. 29, in step 840, a separate clustering method is applied that generated affinity groups made up of devices that share a coefficient of correlation that is equal to or greater than the threshold selected. In step 842, the interface provides the ability to display the activity patterns of each affinity group so that the validity of the selection can be visualized. Then in step 844, a profile is generated for each affinity group to be used in a modeling tool. The profile may comprise 6 specific pieces of information: % Random Read Hit, % Random Read Miss, % Sequential Read, % Write, Average Read size, and Average Write Size. Connecting step B of FIG. 29 logically flows into identically labeled step A of FIG. 30.

FIG. 30 shows step 846 in which the interface provides the ability to display the profile both in tabular and graphical fashion. In step 848, the user is able to save the profiles of the affinity groups, such as in an .XML file that is readable by the modeling and configuration tool.

A system and method has been described for using profiles and for configuring one or more data storage systems based on a number of parameters. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for using a dataset on which IO activity is performed, wherein the dataset represents data stored on one or more data volumes that are logical representations of physical volumes of data stored on one or more storage devices that are part of a data storage environment, the method comprising the steps of:

analyzing IO activity performed on the dataset to determine a correlation between at least two data volumes; and using the correlation to perform a storage management function that may be selected to be modeling and may be selected to be configuring a data storage environment including one or more storage systems.

2. The method of claim 1, wherein the storage management function is related to determining an affinity group of at least two data volumes that are correlated in accordance with a predetermined coefficient of correlation.

3. The method of claim 1, wherein a user interface may be used to select data volumes for which the dataset may be created.

4. The method of claim 1, wherein a clustering process is applied to group together all data volumes that are correlated to each other in accordance with a predetermined mathematical range.

5. The method of claim 1, wherein the correlation is used to determine which data volumes include data which is being used by a software application of interest operating on data in the data storage environment.

6. The method of claim 2, wherein the storage management function is related to determining whether an affinity group is related to a specific software application operating on data stored on data volumes belonging to the affinity group.

7. The method of claim 3, wherein the user interface may be used to present a profile of the IO activity of the devices.

8. The method of claim 4, wherein a profile of the IO activity for each correlated device within a clustered group can be presented on a user interface.

9. The method of claim 7, wherein data volumes may be selected according to how much IO activity is performed.

10. A method for using a dataset on which IO activity is performed, wherein the dataset represents data stored on one or more data volumes that are logical representations of physical volumes of data stored on one or more storage devices that are part of a data storage environment, the method comprising the steps of:

analyzing IO activity performed on the dataset to determine a correlation between at least two data volumes; and using the correlation to perform a storage management function, wherein the storage management function is related to modeling a data storage environment including one or more data storage systems.

11. The method of claim 10, wherein the correlation is used to determine which data volumes include data which is being used by a software application of interest operating on data stored in the data storage environment.

12. A system for using a dataset on which IO activity is performed, wherein the dataset represents data stored on one or more data volumes that are logical representations of data stored on one or more storage devices that are part of a data storage environment the system comprising:

a computer having a memory and a display;

program logic operating in memory, wherein the program logic is configured for execution of the following steps:

analyzing IO activity performed on the dataset to determine a correlation between at least two data volumes; and using the correlation to perform a storage management function that may be selected to be modeling and may be selected to be configuring a data storage environment including one or more storage systems.

13. The system of claim 12, wherein the storage management function is related to determining an affinity group of at least two data volumes that are correlated in accordance with a predetermined coefficient of correlation.

14. The system of claim 12, wherein a user interface may be used to select data volumes for which the dataset may be created.

15. The system of claim 12, wherein the correlation is used to determine which data storage devices include data which is being used by a software application of interest operating on data in the data storage environment.

16. The system of claim 13, wherein the storage management function is related to determining whether an affinity group is related to a specific software application operating on data stored on data volumes belonging to the affinity group.

17. A system for using a dataset on which IO activity is performed, wherein the dataset represents data stored on one or more data volumes that are logical representations of data stored on one or more storage devices that are part of a data storage environment the system comprising:

a computer having a memory and a display;

program logic operating in memory, wherein the program logic is configured for execution of the following steps:

analyzing IO activity performed on the dataset to determine a correlation between at least two data volumes; and using the correlation to perform a storage management function, wherein the storage management function is related to modeling a data storage environment including one or more data storage systems.

18. The system of claim 17, wherein the correlation is used to determine which data storage devices include data which is being used by a software application of interest operating on data stored in the data storage environment.

19. The system of claim 17, wherein the user interface may be used to present a profile of IO activity.

20. The system of claim 19, wherein devices may be selected according to how much IO activity is performed.

21. A program product for using a dataset on which IO activity work is performed, wherein the dataset represents data stored on one or more data volumes that are logical representations of physical volumes of data-stored on one or more storage devices that are part of a data storage environment, the program product including a computer readable medium with program logic configured for causing the following computer-executed steps to occur:

analyzing IO activity performed on the dataset to determine a correlation between at least two data volumes; and using the correlation to perform a storage management function that may be selected to be modeling and may be selected to be configuring a data storage environment including one or more storage systems.

* * * * *